United States Patent
Chase et al.

(10) Patent No.: US 11,819,782 B2
(45) Date of Patent: Nov. 21, 2023

(54) ELECTROWETTING COALESCENCE DEVICE WITH POROUS LAYERS

(71) Applicant: THE UNIVERSITY OF AKRON, Akron, OH (US)

(72) Inventors: George Chase, Wadsworth, OH (US); Ashish Bandekar, Houston, TX (US); Ashish Gadhave, Akron, OH (US)

(73) Assignee: THE UNIVERSITY OF AKRON, Akron, OH (US)

( * ) Notice: Subject to any disclaimer, the term of this patent is extended or adjusted under 35 U.S.C. 154(b) by 777 days.

(21) Appl. No.: 16/608,280

(22) PCT Filed: Apr. 25, 2018

(86) PCT No.: PCT/US2018/029307
§ 371 (c)(1),
(2) Date: Oct. 25, 2019

(87) PCT Pub. No.: WO2018/200640
PCT Pub. Date: Nov. 1, 2018

(65) Prior Publication Data
US 2020/0094167 A1    Mar. 26, 2020

Related U.S. Application Data

(60) Provisional application No. 62/489,506, filed on Apr. 25, 2017.

(51) Int. Cl.
*B01D 17/04*     (2006.01)
*B01D 17/06*     (2006.01)
(Continued)

(52) U.S. Cl.
CPC ........... *B01D 17/045* (2013.01); *B01D 17/06* (2013.01); *B01D 17/0211* (2013.01);
(Continued)

(58) Field of Classification Search
CPC .................................................... B01D 17/045
See application file for complete search history.

(56) References Cited

U.S. PATENT DOCUMENTS 3,268,442 A    8/1966   Pall et al.
3,567,619 A *   3/1971   Brown ................... B01D 29/15
                                                                55/486
(Continued)

FOREIGN PATENT DOCUMENTS

JP          10-43504 H     2/1998
WO      2017/007348     1/2017

OTHER PUBLICATIONS

Hirato et al.; Demulsification of Water-in-Oil Emulsion by an Electrostatic Coalescence Method; Materials Transactions; JIM; vol. 32; No. 3; (1991); pp. 257-263.
(Continued)

*Primary Examiner* — Peter Keyworth
(74) *Attorney, Agent, or Firm* — RENNER KENNER GREIVE BOBAK TAYLOR & WEBER

(57) ABSTRACT

An electrowetting coalescing device for coalescing droplets of a dispersed phase within a continuous phase includes an inlet in fluid communication with a first porous layer and a second porous layer. The first porous layer is employed as a first electrode and the second porous layer is employed as a second electrode, and a voltage difference exists between the first porous layer and the second porous layer to thereby create an electric field between the first porous layer and the second porous layer. The electrowetting coalescing device includes an outlet for receiving a fluid having passed through the first porous layer and the second porous layer.

17 Claims, 13 Drawing Sheets

(51) Int. Cl.
 *B01D 17/02* (2006.01)
 *B03C 11/00* (2006.01)

(52) U.S. Cl.
 CPC ... *B01D 17/0217* (2013.01); *B01L 2400/0415* (2013.01); *B03C 11/00* (2013.01); *B03C 2201/02* (2013.01)

(56) References Cited

U.S. PATENT DOCUMENTS

| | | | |
|---|---|---|---|
| 4,252,631 | A | 2/1981 | Hovarongkura et al. |
| 4,292,179 | A | 9/1981 | Stone et al. |
| 5,468,385 | A | 11/1995 | Inoue |
| 5,750,024 | A | 5/1998 | Spearman |
| 2003/0183525 | A1 | 10/2003 | Elrod et al. |
| 2007/0241068 | A1* | 10/2007 | Pamula ............. B01F 31/65 210/806 |
| 2008/0124252 | A1* | 5/2008 | Marchand ............ C07D 221/18 366/150.1 |
| 2011/0233152 | A1 | 9/2011 | Wieczorek et al. |
| 2011/0277301 | A1 | 11/2011 | Ellis et al. |
| 2014/0034580 | A1 | 2/2014 | Chen |

OTHER PUBLICATIONS

Eow et al.; Drop/drop coalescence in an electric field: the effects of applied electric field and electrode geometry; Colloids and Surfaces A: Physicochem. Eng. Aspects 219 (2003) 253-279.

Holto et al.; Electrocoalescence of Drops in a Water-in-Oil Emulsion; 2009 Annual Report Conference on Electrical Insulation and Dielectric Phenomena.

Eow et al.; Electrostatic enhancement of coalescence of water droplets in oil: a review of the current understanding; Chemical Engineering Journal 84 (2001) 173-192.

Chiesa et al.; Forces acting on water droplets falling in oil under the influence of an electric field: numerical predictions versus experimental observations; European Journal of Mechanics B/Fluids 24 (2005) 717-732.

International Search Report and Written Opinion for International Application No. PCT/US2018/029307; dated Jul. 3, 2018.

* cited by examiner

ELECTROWETTING COALESCENCE DEVICE WITH POROUS LAYERS

CROSS-REFERENCE TO RELATED APPLICATIONS

The present application claims the benefit of U.S. Provisional Patent Application No. 62/489,506, filed Apr. 25, 2017, incorporated herein by reference.

FIELD OF THE INVENTION

Embodiments of the invention are directed toward an electrowetting coalescence device with one or more porous layers. The electrowetting coalescence device may be particularly useful for separating water from diesel fuel.

BACKGROUND OF THE INVENTION

Organic liquids having dispersed water drops are commonly encountered in the oil, chemical, and biochemical industries. One example is dispersed water drops in crude oil. To remove this water, electrostatic coalescing vessels may be used. Electrostatic coalescing vessels generally utilize electrostatic grids, where water droplets present in the crude oil will tend to coalesce between these grids. The treated crude is collected at the top of the vessel while the effluent water is collected at the bottom.

Though much water may be removed at this portion of the refining process, refined fuels, such as ultra-low-sulfur diesel (ULSD), still contain amounts of water in suspension. The upstream water removal may not remove all of the water, or water may be undesirably joined with the fuel at a later stage. This water in fuel can cause severe problems to an engine such as, rust formation, clogging of fuel injectors, and subsequent exploding of fuel injector tips. These problems may also lead to engine under-performance, causing excess pollution.

Separation of water droplets larger than about 100 micrometers ($\mu$m) from the fuels can be effectively and economically done using standard filtration techniques, such as filter media, gravity settlers, and hydrocylones. But, droplets smaller than 100 micrometers may be more difficult to separate and require alternative techniques. Coalescing filters, absorbers, and water rejecting membranes have been utilized to increase drop sizes to make the drops easier to separate downstream prior to entry into the engine. However, these currently utilized techniques each have their own disadvantages. For example, certain known apparatuses are too large for utilization with a standard diesel engine. Another disadvantage is the removal of too little of the water.

Thus, there remains a need in the art for an improved device for separating droplets of a dispersed phased from a continuous phase.

SUMMARY OF THE INVENTION

In a first embodiment, the present invention provides an electrowetting coalescing device for coalescing droplets of a dispersed phase within a continuous phase comprising an inlet in fluid communication with a first porous layer and a second porous layer, the first porous layer employed as a first electrode, the second porous layer employed as a second electrode, wherein a voltage difference exists between the first porous layer and the second porous layer to thereby create an electric field between the first porous layer and the second porous layer, and an outlet for receiving a fluid having passed through the first porous layer and the second porous layer.

In a second embodiment, the present invention provides an electrowetting coalescing device as in any of the above embodiments, further comprising a third porous layer in fluid communication with the first porous layer and the second porous layer, the first porous layer being employed as a positive electrode and being positioned between the second porous layer and the third porous layer, the second porous layer being employed as a grounded electrode, and the third porous layer employed as a grounded electrode to thereby create a second electric field between the first porous layer and the third porous layer.

In a third embodiment, the present invention provides an electrowetting coalescing device as in any of the above embodiments, the second porous layer being positioned to receive the fluid therethrough prior to the first porous layer, the first porous layer being positioned to receive the fluid therethrough prior to the third porous layer, the second porous layer having a mean average pore size, the first porous layer having a mean average pore size, the third porous layer having a mean average pore size, the mean average pore size of the first porous layer being at least 2 times greater than the mean average pore size of the second porous layer, and the mean average pore size of the third porous layer being at least 2 times greater than the mean average pore size of the first porous layer.

In a fourth embodiment, the present invention provides an electrowetting coalescing device as in any of the above embodiments, wherein the first porous layer, the second porous layer, and the third porous layer are each shaped as flat sheets, each flat sheet being substantially parallel with the other flat sheets.

In a fifth embodiment, the present invention provides an electrowetting coalescing device as in any of the above embodiments, wherein the first porous layer, the second porous layer, and the third porous layer are each shaped as hollow cylinders.

In a sixth embodiment, the present invention provides an electrowetting coalescing device as in any of the above embodiments, wherein the first porous layer, the second porous layer, and the third porous layer each comprise metal.

In a seventh embodiment, the present invention provides an electrowetting coalescing device as in any of the above embodiments, wherein the metal is woven stainless steel mesh.

In an eighth embodiment, the present invention provides an electrowetting coalescing device as in any of the above embodiments, wherein the first porous layer, the second porous layer, and the third porous layer each further comprise a dielectric layer on a metal substrate, and a hydrophobic layer on the dielectric layer.

In a ninth embodiment, the present invention provides an electrowetting coalescing device as in any of the above embodiments, wherein the dielectric layers and the hydrophobic layers are formed as gradients having a thicker portion and a thinner portion.

In a tenth embodiment, the present invention provides an electrowetting coalescing device as in any of the above embodiments, wherein the first porous layer, the second porous layer, and the third porous layer are each pleated.

In an eleventh embodiment, the present invention provides a method of operating the device as in any of the above embodiments, comprising providing a fluid having a continuous phase and a dispersed phase to the apparatus, the dispersed phase being in the form of droplets, the fluid flowing through the first porous layer and the second porous layer, allowing the droplets to attract to the first porous layer, allowing the droplets to coalesce within the first porous layer until the droplets form combined droplets, allowing the combined droplets to flow to and attract to the second porous layer, allowing the combined droplets to coalesce within the second porous layer until the combined droplets form larger droplets, and removing the larger droplets from the continuous phase.

In a twelfth embodiment, the present invention provides a method as in any of the above embodiments, wherein the step of removing the larger droplets occurs in a drain.

In a thirteenth embodiment, the present invention provides a method as in any of the above embodiments, wherein the step of removing the larger droplets occurs in a downstream apparatus selected from the group consisting of barrier filters, cyclones, absorbents, gravity settlers, centrifuges, impactors, lamella separators, inclined stacked plates, screens, and quiescent chambers.

In a fourteenth embodiment, the present invention provides an electrowetting coalescing device as in any of the above embodiments, further comprising a spin-on cartridge.

In a fifteenth embodiment, the present invention provides an electrowetting coalescing device as in any of the above embodiments, wherein the first porous layer and the second porous layer are each shaped as hollow cylinders.

In a sixteenth embodiment, the present invention provides an electrowetting coalescing device as in any of the above embodiments, the spin-on cartridge comprising an inlet face and a housing extending from the inlet face to thereby enclose the first porous layer and the second porous layer within the housing.

In a seventeenth embodiment, the present invention provides an electrowetting coalescing device as in any of the above embodiments, the inlet face comprising a centrally-positioned threaded opening having threads adapted to be mated with the threads of a threaded post.

In an eighteenth embodiment, the present invention provides an electrowetting coalescing device as in any of the above embodiments, wherein the first porous layer and the second porous layer each comprise metal.

In a nineteenth embodiment, the present invention provides an electrowetting coalescing device as in any of the above embodiments, wherein the metal is woven stainless steel mesh.

In a twentieth embodiment, the present invention provides an electrowetting coalescing device as in any of the above embodiments, wherein the first porous layer and the second porous layer further comprise a dielectric layer on a metal substrate, and a hydrophobic layer on the dielectric layer.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

Embodiments of the invention are based, at least in part, on an electrowetting coalescence device with one or more porous layers. The electrowetting coalescence device includes a first electrode and a second electrode, where a voltage difference exists between the first electrode and the second electrode to thereby generate an electric field. In one or more embodiments, a first porous layer may be employed as the first electrode and a second porous layer may be employed as the second electrode. In other embodiments, a first porous layer may be employed as the first electrode and a housing may be employed as the second electrode. The electric field generated by the first electrode and the second electrode promotes coalescence of droplets of a dispersed phase (e.g. water) by increasing the attractive force between the droplets. The coalescence of the dispersed phase droplets generally includes two or more dispersed phase droplets coming together, the droplets staying in contact for sufficient duration, and a thin film of continuous phase existing between the droplets rupturing, thereby forming a larger droplet from the two or more droplets. The electric field may be said to modify the wetting properties of the porous layers based on the principles of electrowetting, thereby improving the adherence of the dispersed phase droplets on the surfaces of the porous layers. The porous layers provide increased surface area for the fluid to contact, thereby giving more area for contact of the dispersed phase droplets. Thus, electrowetting coalescence devices of the present invention are able to achieve improved coalescence of droplets of a dispersed phase within a continuous phase.

As described herein, a voltage difference exists between a first electrode and a second electrode, and in one or more embodiments, between a second electrode and a third electrode, and so on, to thereby generate one or more electric fields in an electrowetting coalescence device. As generally understood by the skilled person, a voltage difference between a first electrode and a second electrode may be accomplished in a variety of manners. For example, an electric field may be achieved by utilizing a first electrode provided with an applied voltage such that the first electrode is employed as a positive electrode, and a second electrode that is grounded and employed as a grounded electrode. Electric fields may also be achieved between a negative electrode and a grounded electrode, between a positive electrode and a negative electrode, between a positive electrode and a less-positive electrode, and between a negative electrode and a more-negative electrode. Any of these embodiments may be utilized with the electrowetting coalescing devices described herein, so long as one or more suitable electric fields are generated. In embodiments not having a grounded electrode, it may be desirable to ground the external housing or another component for safety purposes.

Figure 1:
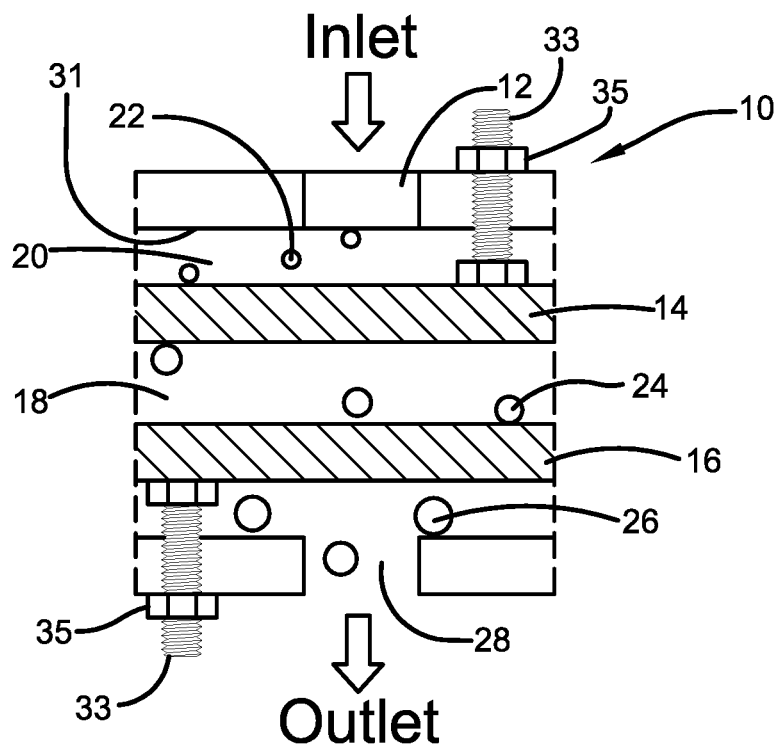
FIG. 1 is a cross-sectional schematic of an electrowetting coalescence device, the electrowetting coalescence device having two porous layers.

With reference to FIG. 1, an electrowetting coalescence device, generally represented by the numeral 10, includes an inlet 12 in fluid communication with a first porous layer 14 and a second porous layer 16. First porous layer 14 is employed as a first electrode and second porous layer 16 is employed as a second electrode, with a voltage difference between first porous layer 14 and second porous layer 16. This creates an electric field between first porous layer 14 and second porous layer 16. An insulating gap 18 exists between first porous layer 14 and second porous layer 16 to prevent short circuiting of the electric field.

A fluid having a continuous phase 20 and a dispersed phase 22, in the form of small droplets 22, may be provided to inlet 12 and subsequently to first porous layer 14. Small droplets 22 are electrolytic, polarizable, or otherwise capable of conducting current or being electrically charged. Based on the presence of the electric field, and the principles of electrowetting, which are generally known to the skilled person, small droplets 22 are attracted to first porous layer 14 by the forces that result from the applied electric field.

Small droplets 22 will continue to attract to first porous layer 14 and will begin to grow by electrocoalescence and collision of small droplets 22 with other small droplets 22. This growth will continue until the combined droplets 24 formed from a plurality of small droplets 22 are of sufficient size such that gravity force or the drag force of the flow of continuous phase 20 is dominant over the electrical attraction.

Combined droplets 24, which may also be referred to as larger droplets 24, are then provided to second porous layer 16. In order to account for the larger size of larger droplets 24, and to thereby coalesce and collect larger droplets 24, second porous layer 16 may have pore sizing that is greater than the pore sizing of first porous layer 14.

The above described process then repeats. Combined droplets 24 are electrolytic, polarizable, or otherwise capable of conducting current or being electrically charged. Based on the presence of the electric field, and the principles of electrowetting, combined droplets 24 are attracted to second porous layer 14 by the forces that result from the applied electric field.

Combined droplets 24 will continue to attract to second porous layer 16 and will begin to grow by electrocoalescence and collision of combined droplets 24 with other combined droplets 24. This growth will continue until the exit droplets 26 formed from a plurality of combined droplets 24 are of sufficient size such that the gravity force or drag force of the flow of continuous phase 20 is dominant over the electrical attraction.

Exit droplets 26, which may also be referred to as largest droplets 26, pass through second porous layer 16 and to an outlet 28. Largest droplets 26 may collect in a drain for eventual removal of largest droplets 26. In these or other embodiments, the flow from outlet 28 may be provided to a downstream apparatus, such as a barrier filter, for removal of the largest droplets 26 from continuous phase 20.

Figure 2:
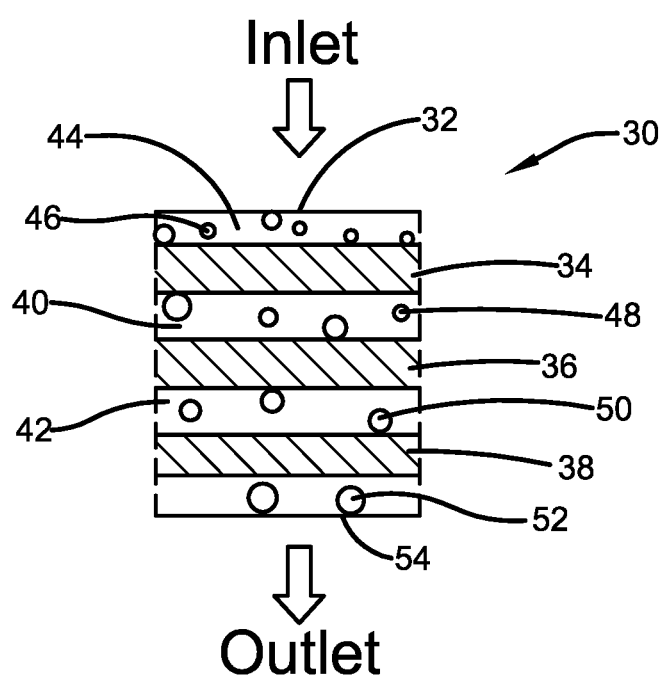
FIG. 2 is a cross-sectional schematic of an electrowetting coalescence device, the electrowetting coalescence device having three porous layers.

With reference to FIG. 2, an electrowetting coalescence device, generally represented by the numeral 30, includes an inlet 32 in fluid communication with a first porous layer 34, a second porous layer 36, and a third porous layer 38. Second porous layer 36 is employed as a first electrode, e.g. a positive electrode, and first porous layer 34 and third porous layer 38 may be employed as a second electrode and a third electrode, e.g. grounded electrodes. This creates a first electric field between first porous layer 34 and second porous layer 36 and a second electric field between second porous layer 36 and third porous layer 38. A first insulating gap 40 exists between first porous layer 34 and second porous layer 36 and a second insulating gap 42 exists between second porous layer 36 and third porous layer 38 to prevent short circuiting of the electric fields.

A fluid having a continuous phase 44 and a dispersed phase 46, in the form of small droplets 46, may be provided to inlet 32 and subsequently to first porous layer 34. Small droplets 46 are electrolytic, polarizable, or otherwise capable of conducting current or being electrically charged. Based on the presence of the electric field, and the principles of electrowetting, small droplets 46 are attracted to first porous layer 34 by the forces that result from the applied electric field.

Small droplets 46 will continue to attract to first porous layer 34 and will begin to grow by electrocoalescence and collision of small droplets 46 with other small droplets 46. This growth will continue until the combined droplets 48 formed from a plurality of small droplets 46 are of sufficient size such that the gravity force or drag force of the flow of continuous phase 44 is dominant over the electrical attraction.

Combined droplets 48, which may also be referred to as larger droplets 48, are then provided to second porous layer 36. In order to account for the larger size of larger droplets 48, and to thereby coalesce and collect larger droplets 48, second porous layer 36 may have pore sizing that is greater than the pore sizing of first porous layer 34.

The above described process then repeats. Combined droplets 48 are electrolytic, polarizable, or otherwise capable of conducting current or being electrically charged. Based on the presence of the electric field, and the principles of electrowetting, combined droplets 48 are attracted to second porous layer 36 by the forces that result from the applied electric field.

Combined droplets 48 will continue to attract to second porous layer 36 and will begin to grow by electrocoalescence and collision of combined droplets 48 with other combined droplets 48. This growth will continue until the combined droplets 50 formed from a plurality of combined droplets 48 are of sufficient size such that the gravity force or drag force of the flow of continuous phase 44 is dominant over the electrical attraction.

Combined droplets 50, which may also be referred to as larger droplets 50, are then provided to third porous layer 38. In order to account for the larger size of larger droplets 50, and to thereby coalesce and collect larger droplets 50, third porous layer 38 may have pore sizing that is greater than the pore sizing of second porous layer 36.

The above described process then repeats. Combined droplets 50 are electrolytic, polarizable, or otherwise capable of conducting current or being electrically charged. Based on the presence of the electric field, and the principles of electrowetting, combined droplets 50 are attracted to third porous layer 38 by the forces that result from the applied electric field.

Combined droplets 50 will continue to attract to third porous layer 38 and will begin to grow by electrocoalescence and collision of combined droplets 50 with other combined droplets 50. This growth will continue until the exit droplets 52 formed from a plurality of combined droplets 50 are of sufficient size such that the gravity force or drag force of the flow of continuous phase 44 is dominant over the electrical attraction.

Exit droplets 52, which may also be referred to as largest droplets 52, pass through third porous layer 38 and to an outlet 54. Largest droplets 52 may collect in a drain for eventual removal of largest droplets 52. In these or other embodiments, the flow from outlet 54 may be provided to a downstream apparatus, such as a barrier filter, for removal of the largest droplets 52 from continuous phase 44.

Figure 3:
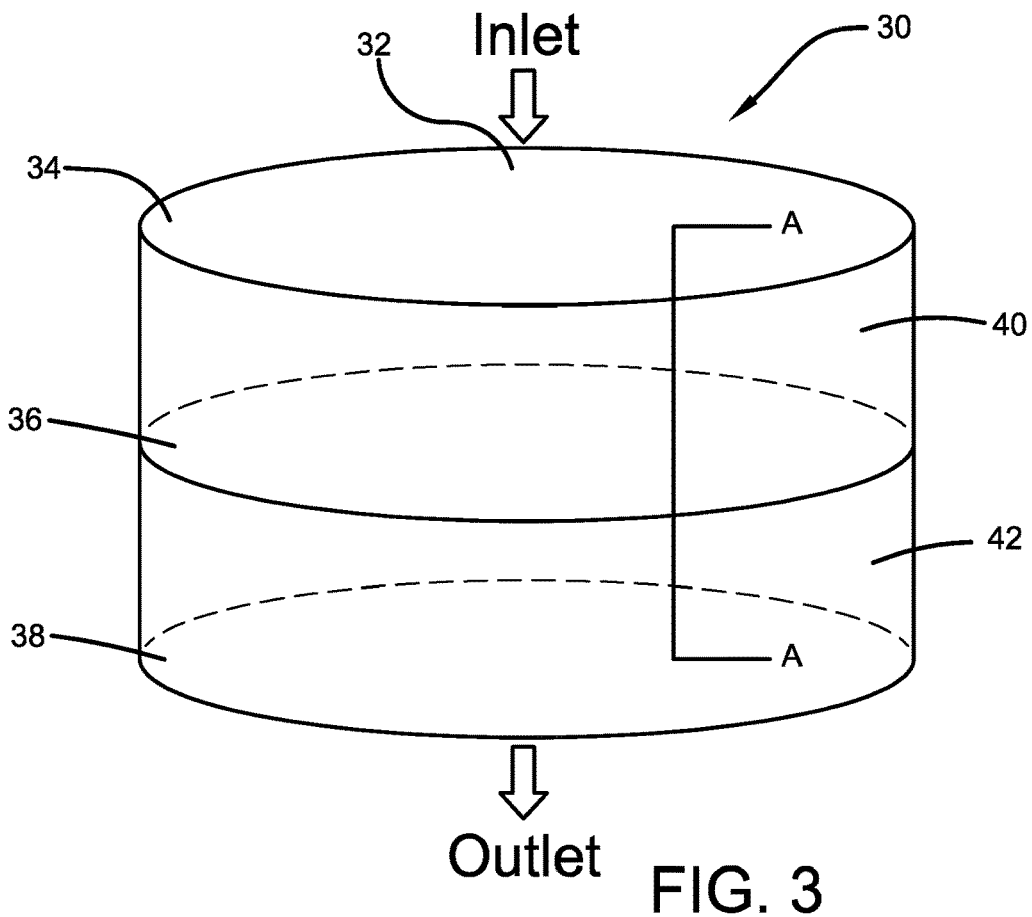
FIG. 3 is a schematic of an electrowetting coalescence device, the electrowetting coalescence device having three porous layers.

It should be appreciated that FIG. 1 and FIG. 2 are cross-sectional views of an electrowetting coalescence device. To provide context for the cross-sectional views, FIG. 3 is provided. With reference to FIG. 3, electrowetting coalescence device 30 includes inlet 32 in fluid communication with first porous layer 34, second porous layer 36, and third porous layer 38. Second porous layer 36 is employed as a first electrode, first porous layer 34 is employed as a second electrode, and third porous layer 38 is employed as a third electrode, creating the electric fields described above. First insulating gap 40 exists between first porous layer 34 and second porous layer 36 and second insulating gap 42 exists between second porous layer 36 and third porous layer 38. FIG. 2 may be said to show a cross-sectional representation of an electrowetting coalescence device along an orthogonal line (e.g. line A-A of FIG. 3). FIG. 1 may be said to show a similar cross-sectional representation along an orthogonal line if the electrowetting coalescence device of FIG. 3 had only two porous layers.

Figure 17:
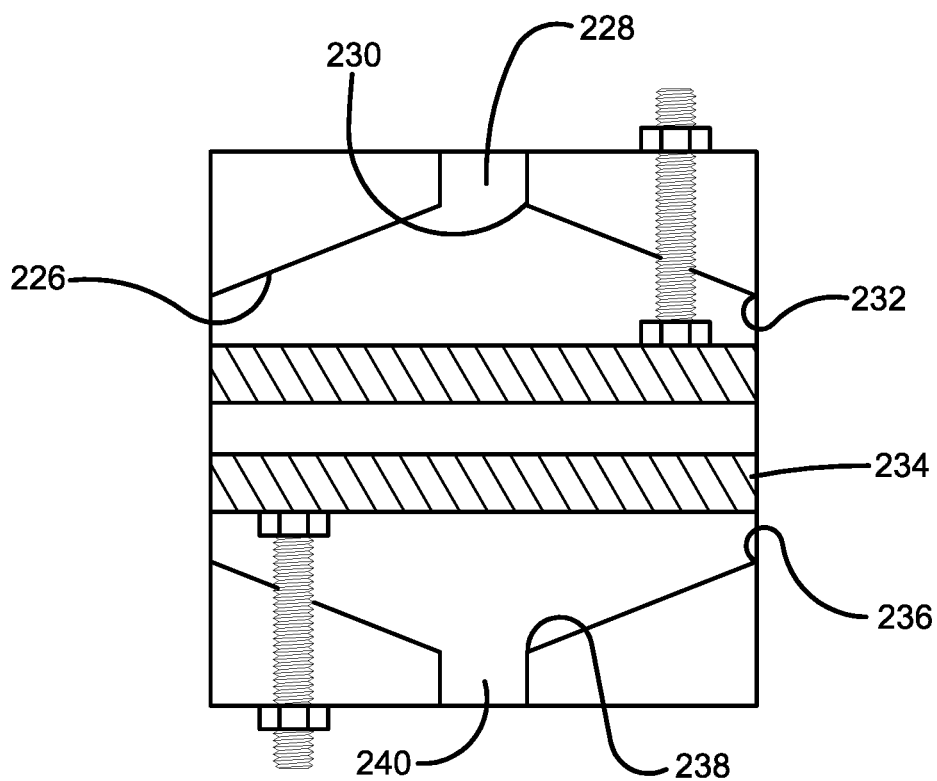
FIG. 17 is a schematic showing a dual hollow frustoconical housing.

In one or more embodiments, as generally shown in FIG. 1, a housing may be a planar shaped housing 31 shaped parallel, or substantially parallel, with first porous layer 14 and second porous layer 16. In one or more embodiments, a housing may include one or more hollow frustoconical shapes, such as double frustoconical shaped housing 226, as shown in FIG. 17. Inlet 228 may include a narrow portion 230 extending into a wider portion 232 to from a hollow frustoconical shape. One or more porous layers 234 may be positioned between wider portion 232 of inlet 228 and a wider portion 236 of an outlet 240. Wider portion 236 extends to a narrow portion 238 to form a hollow frustoconical shape.

A housing with one or more hollow frustoconical shapes may be particularly desirable where certain fluids and flow rates passing through a planar shaped housing may result in non-uniform flow through one or more porous layers. The one or more hollow frustoconical shapes may allow the fluid to achieve more uniform flow through one or more porous layers.

Figure 18:
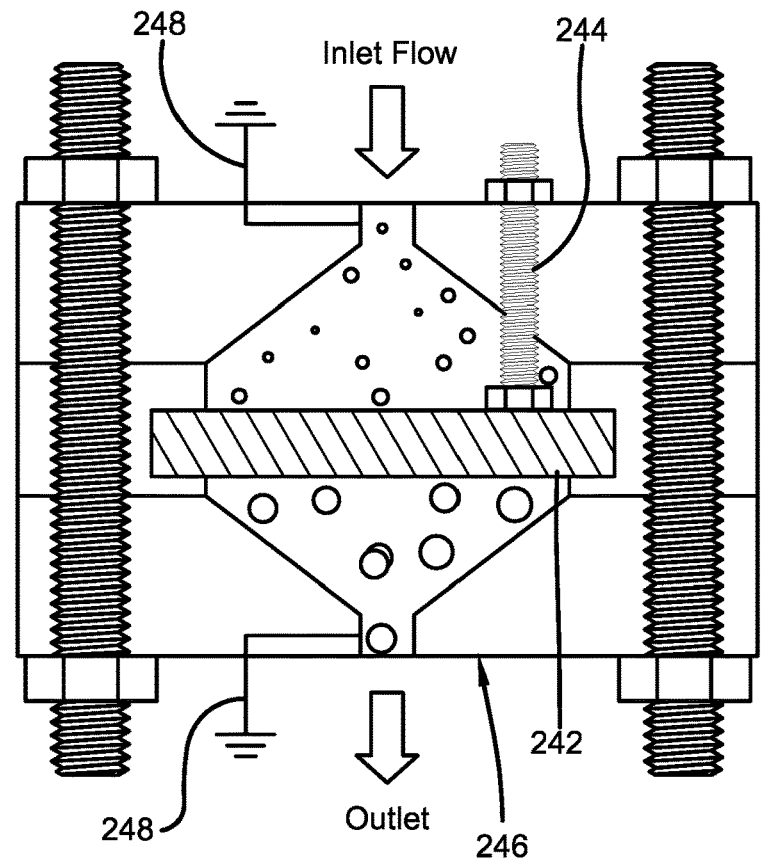
FIG. 18 is a schematic showing a dual hollow frustoconical housing with a single porous layer as a first electrode and the housing as a second electrode.
Figure 19:
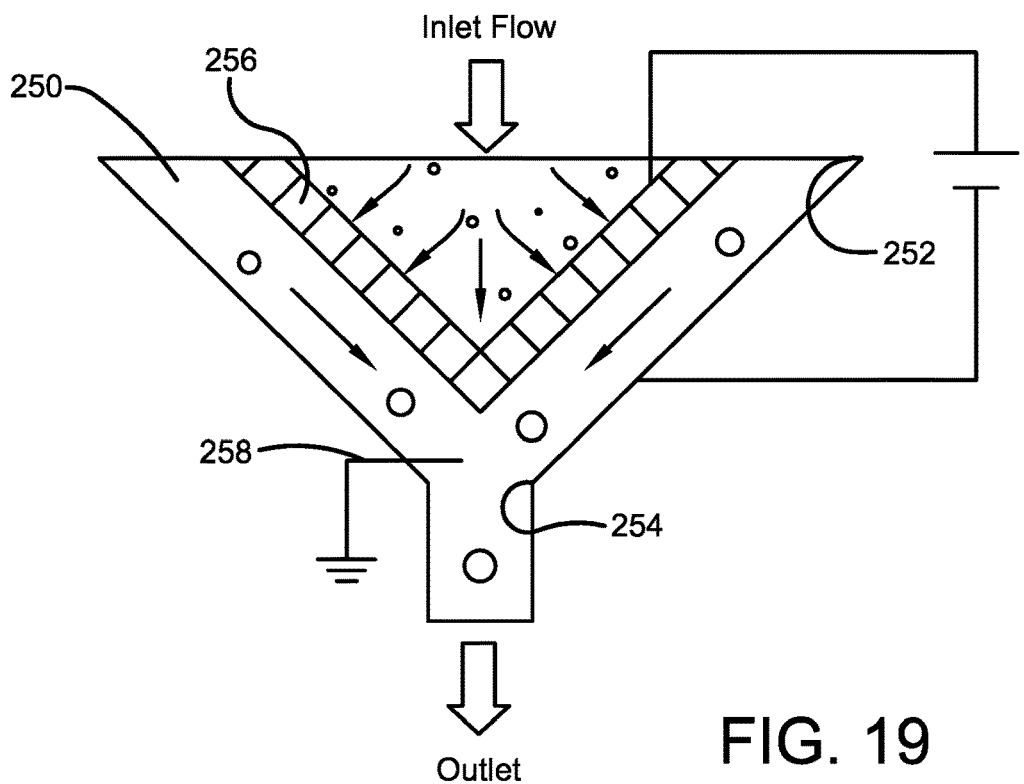
FIG. 19 a schematic showing a single hollow frustoconical housing with a single porous layer as a first electrode and the housing as a second electrode.
Figure 20:
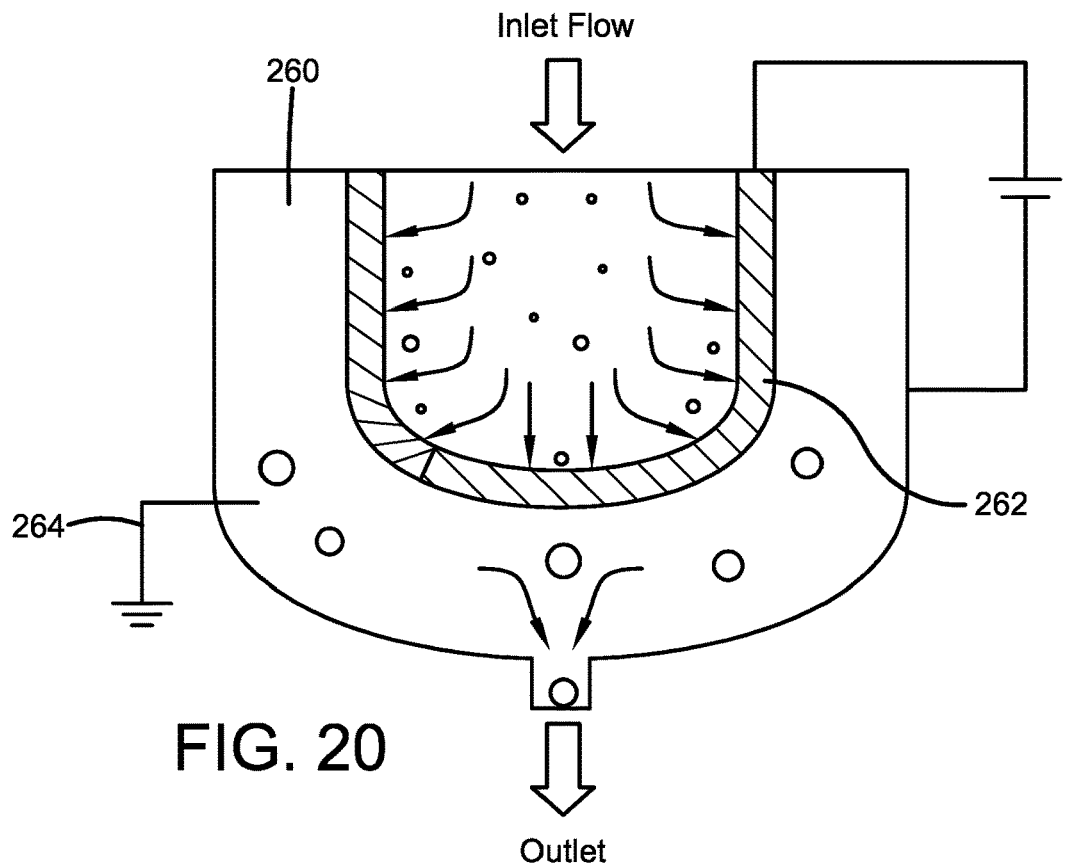
FIG. 20 a schematic showing a partial hollow spherocylinder housing with a single porous layer as a first electrode and the housing as a second electrode.

With reference to FIG. 18, one or more embodiments may utilize a single porous layer as the positive electrode and the housing as the grounded electrode. Single porous layer 242 may be employed as a first electrode, e.g. a positive electrode, based on contact with a threaded screw 244. A housing 246 may be employed as a second electrode, e.g. a grounded electrode, based on housing having one or more grounded connections 248. The operation of such embodiments is as disclosed elsewhere herein.

Figure 4:
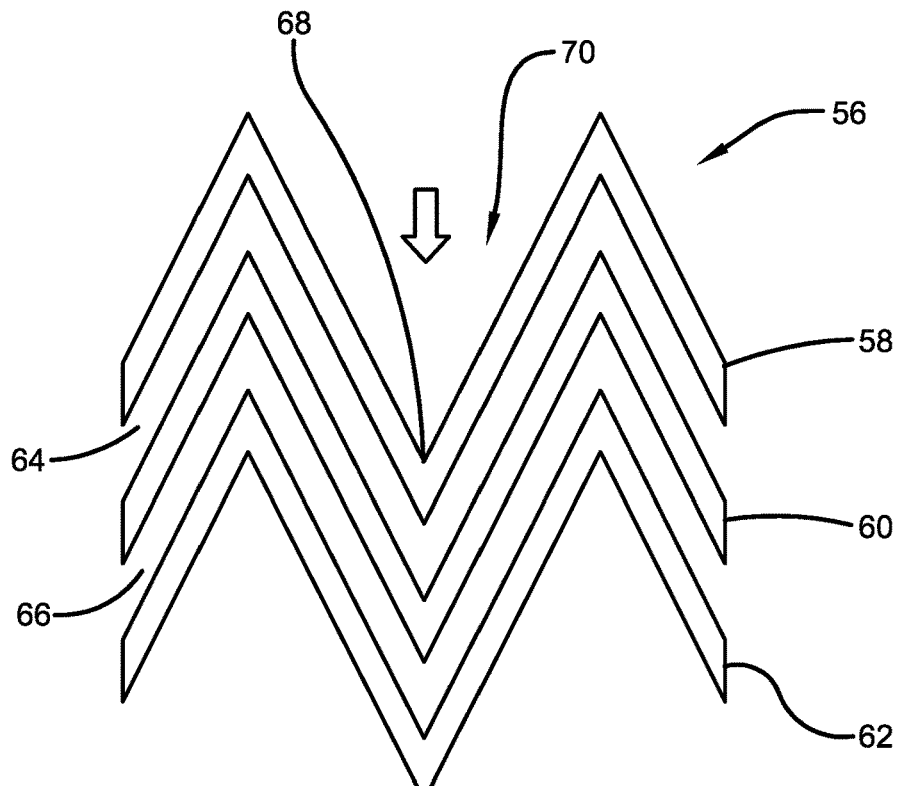
FIG. 4 is a schematic of pleated layers of an electrowetting coalescence device.

In one or more embodiments, any of the herein disclosed porous layers (e.g. first porous layer 34) may be pleated layers, as generally shown in FIG. 4. Pleated layers may be utilized to increase the surface area for coalescence within a given space. With reference to FIG. 4, which shows a cross-section representation, such as along line A-A of FIG. 3 if the electrowetting coalescence device of FIG. 3 had pleated layers, a pleated element 56 is shown. Pleated element 56 includes first porous layer 58, second porous layer 60, and third porous layer 62. For the three-layer pleated element 56 shown in FIG. 4, second porous layer 60 may be employed as a first electrode, e.g. positive electrode, for an electrowetting coalescence device. First porous layer 58 and third porous layer 62 may be employed as a second electrode and a third electrode, e.g. grounded electrodes, creating the electric fields described above. First insulating gap 64 exists between first porous layer 58 and second porous layer 60 and second insulating gap 66 exists between second porous layer 60 and third porous layer 62.

Where pleated layers are utilized, flow of a fluid having a continuous phase and a dispersed phase (e.g. continuous phase 20 and dispersed phase 22) may be allowed to direct preferentially into certain paths through the pleated layers. With reference to FIG. 4, a preferential path may occur at or near the bottoms 68 of the pleat valleys 70 within pleated element 56. Coalesced drops (e.g. combined droplets 24) may tend to concentrate at or near bottoms 68 of pleat valleys 70 thereby affecting greater coalescence at or near bottoms 68 of pleat valleys 70.

Though FIGS. 1-4 show embodiments having two porous layers and three porous layers, embodiments may employ any suitable number of layers within an electrowetting coalescence device. In one or more embodiments, an electrowetting coalescence device may include two or more porous layers. In one or more embodiments, an electrowetting coalescence device may include three or more porous layers. In one or more embodiments, it may be desirable to employ an odd number of porous layers, where each endmost porous layer is a grounded electrode. In one or more embodiments, an electrowetting coalescence device may include five porous layers, with one or more embodiments including an electrode sequence of grounded electrode porous layer—charged electrode porous layer—grounded electrode porous layer—charged electrode porous layer—grounded electrode porous layer. In one or more embodiments, an electrowetting coalescence device may include seven porous layers, in other embodiments, nine porous layers, with one or more embodiments including a similar electrode sequence where each endmost porous layer is a grounded electrode.

Though FIGS. 1-4 are representatively shown as the inlet to outlet flow generally occurring vertically from an upper location to a lower location, it should be appreciated that one or more embodiments may employ an electrowetting coalescence device having inlet to outlet flow generally occurring vertically from a lower location to an upper location.

Though FIGS. 1-4 are representatively shown as the inlet to outlet flow generally occurring vertically, it should be appreciated that one or more embodiments may employ an electrowetting coalescence device having inlet to outlet flow generally occurring horizontally.

Embodiments of an electrowetting coalescence device may utilize inlet to outlet flow generally occurring at any suitable flow path other than vertical and horizontal. That is, one or more embodiments may employ an electrowetting coalescence device having inlet to outlet flow generally occurring diagonally at any suitable angle. Such diagonal flow path, or vertical flow path or horizontal flow path, might be selected based on a desired mounting position for an electrowetting coalescence device near an engine.

It should be appreciated that one or more embodiments of the present invention, such as shown in FIGS. 1-3, provide an electrowetting coalescence device having a plurality of porous layers as flat sheets, where the flat sheets are parallel, or substantially parallel, with each other. In one or more embodiments, flat sheets may be shaped as circles, rectangles, or any other suitable geometric shape. FIG. 4, which shows pleated porous layers, may also be said to be in a flat sheet orientation, inasmuch as respective portions of a first layer and a second layer are parallel, or substantially parallel, with each other. In one or more embodiments, flat sheet oriented pleated porous layers may be shaped as circles, rectangles, or any other suitable geometric shape.

Figure 5:
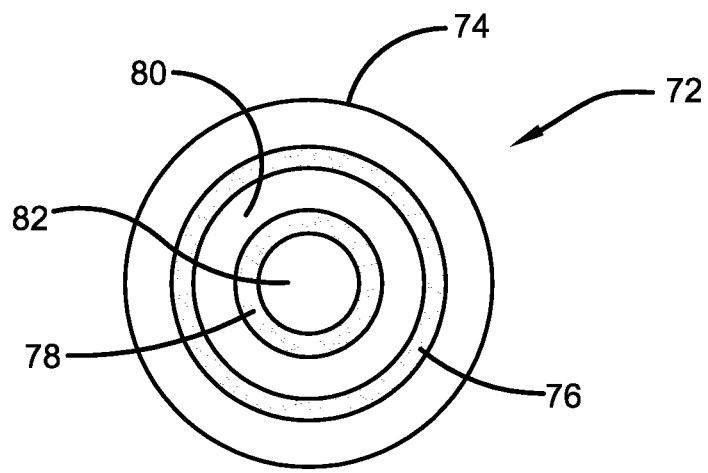
FIG. 5 is a cross-sectional schematic of an electrowetting coalescence device, the electrowetting coalescence device having two porous layers and utilizing concentric flow.
Figure 6:
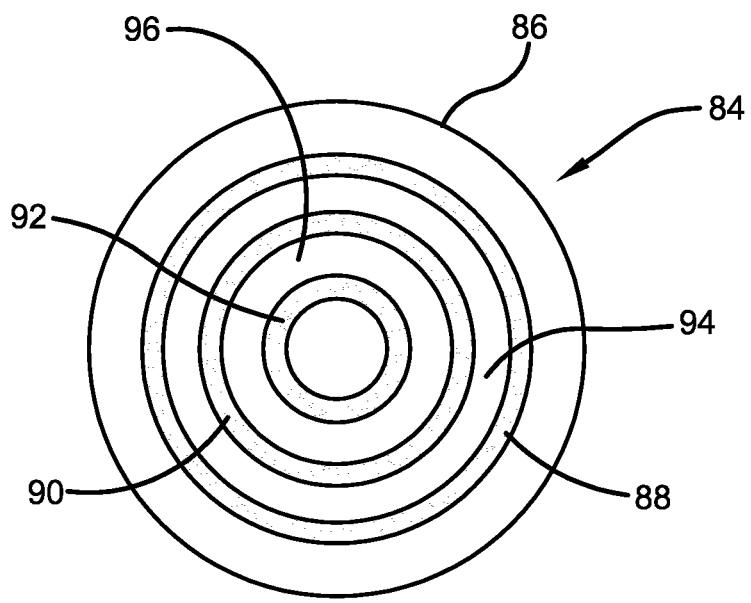
FIG. 6 is a cross-sectional schematic of an electrowetting coalescence device, the electrowetting coalescence device having three porous layers and utilizing concentric flow.
Figure 7:
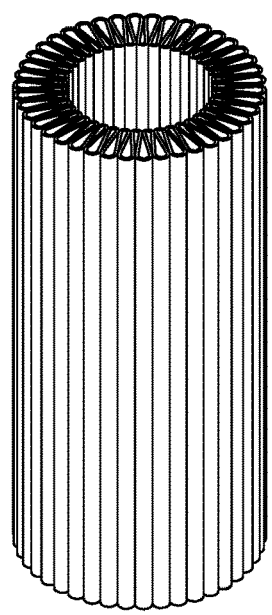
FIG. 7 is a schematic of a cylindrical pleated layer of an electrowetting coalescence device.

In one or more embodiments, such as shown in FIGS. 5-7, and as further described herein below, an electrowetting coalescence device employs a plurality of porous, cylindrical layers as concentric layers. In these embodiments, a first porous, cylindrical layer is positioned inside of a second porous, cylindrical layer. As used herein, the terms cylindrical and cylindrically-shaped refer to hollow cylinders.

With reference to FIG. 5, an electrowetting coalescence device, generally represented by the numeral 72, includes an inlet 74 in fluid communication with a first cylindrical porous layer 76 and a second cylindrical porous layer 78. First cylindrical porous layer 76 is employed as a first electrode, e.g. positive electrode. First cylindrical porous layer 78 is employed as a second electrode, e.g. grounded electrode. This creates an electric field between first cylindrical porous layer 76 and first cylindrical porous layer 78. An insulating gap 80 exists between first cylindrical porous layer 76 and first cylindrical porous layer 78 to prevent short circuiting of the electric field.

It should be appreciated that the above description of the operation of electrowetting coalescence device 10 also applies to electrowetting coalescence device 72. A fluid having a continuous phase and a dispersed phase, in the form of small droplets, may be provided to inlet 74 and coalescence of the small droplets is allowed to occur in first cylindrical porous layer 76 and second cylindrical porous layer 78. The gravity force or drag force of the fluid carries the coalesced drops through first cylindrical porous layer 76 and second cylindrical porous layer 78 and to an outlet 82. The coalesced drops may collect in a drain for eventual removal. In these or other embodiments, the flow from outlet 82 may be provided to a downstream apparatus, such as a barrier filter, for removal of the coalesced drops.

With reference to FIG. 6, an electrowetting coalescence device, generally represented by the numeral 84, includes an inlet 86 in fluid communication with a first cylindrical porous layer 88, a second cylindrical porous layer 90, and a third cylindrical porous layer 92. Second cylindrical porous layer 90 is employed as a first electrode, e.g. positive electrode. First cylindrical porous layer 88 and third cylindrical porous layer 92 are employed as a second electrode and a third electrode, e.g. grounded electrodes. This creates a first electric field between first cylindrical porous layer 88 and second cylindrical porous layer 90 and a second electric field between second cylindrical porous layer 90 and third cylindrical porous layer 92. A first insulating gap 94 exists between first cylindrical porous layer 88 and second cylindrical porous layer 90 and a second insulating gap 96 exists between second cylindrical porous layer 90 and third cylindrical porous layer 92 to prevent short circuiting of the electric fields.

It should be appreciated that the above description of the operation of electrowetting coalescence device 30 also applies to electrowetting coalescence device 84. A fluid having a continuous phase and a dispersed phase, in the form of small droplets, may be provided to inlet 86 and coalescence of the small droplets is allowed to occur in first cylindrical porous layer 88, second cylindrical porous layer 90, and third cylindrical porous layer 92. The gravity force or drag force of the fluid carries the coalesced drops through first cylindrical porous layer 88, second cylindrical porous layer 90, and third cylindrical porous layer 92 and to an outlet 94. The coalesced drops may collect in a drain for eventual removal. In these or other embodiments, the flow from outlet 94.

It should be appreciated that FIG. 5 and FIG. 6 are cross-sectional views of an electrowetting coalescence device. To provide context for the cross-sectional views, FIG. 7 is provided. With reference to FIG. 7, a cylindrical porous layer is shown. The cylindrical porous layers (e.g. first cylindrical porous layer 88) of FIG. 5 and FIG. 6 may be said to show a cross-sectional representation of a cylindrical porous layer along an orthogonal line. FIG. 7 shows only one cylindrical porous layer, while FIG. 5 shows two cylindrical porous layers and FIG. 6 shows three cylindrical porous layers.

As disclosed above, in one or more embodiments, any of the herein disclosed porous layers (e.g. first cylindrical porous layer 76) may be pleated layers, as generally shown in FIG. 4. FIG. 7 also shows a representation of a pleated layer or pleated electrode formed in a cylindrical shape.

Though FIG. 5 and FIG. 6 show embodiments having two porous layers and three porous layers, embodiments may employ any suitable number of cylindrical layers within an electrowetting coalescence device. In one or more embodiments, an electrowetting coalescence device may include two or more cylindrical porous layers. In one or more embodiments, an electrowetting coalescence device may include three or more cylindrical porous layers. In one or more embodiments, it may be desirable to employ an odd number of cylindrical porous layers, where each endmost porous cylindrical layer is a grounded electrode. In one or more embodiments, an electrowetting coalescence device may include five cylindrical porous layers, with one or more embodiments including an electrode sequence of grounded electrode cylindrical porous layer—charged electrode cylindrical porous layer—grounded electrode cylindrical porous layer—charged electrode cylindrical porous layer— grounded electrode cylindrical porous layer. In one or more embodiments, an electrowetting coalescence device may include seven cylindrical porous layers, in other embodiments, nine cylindrical porous layers, with one or more embodiments including a similar electrode sequence where each endmost cylindrical porous layer is a grounded electrode.

Though FIG. 5 and FIG. 6 are representatively shown as the inlet to outlet flow generally occurring from the outside to the inside, it should be appreciated that one or more embodiments may employ an electrowetting coalescence device having inlet to outlet flow generally occurring vertically from the inside to the outside.

In one or more embodiments, such as shown in FIGS. 21A-23, and as further described herein below, an electrowetting coalescence device employs one or more coils. The one or more coils may be made from any of the herein described materials with respect to a porous layer.

Figure 21A:
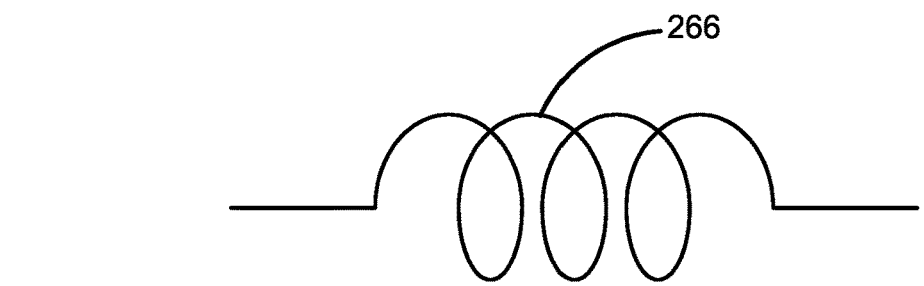
FIG. 21A is a side view schematic of a coil having both a first electrode and a second electrode.
Figure 21B:
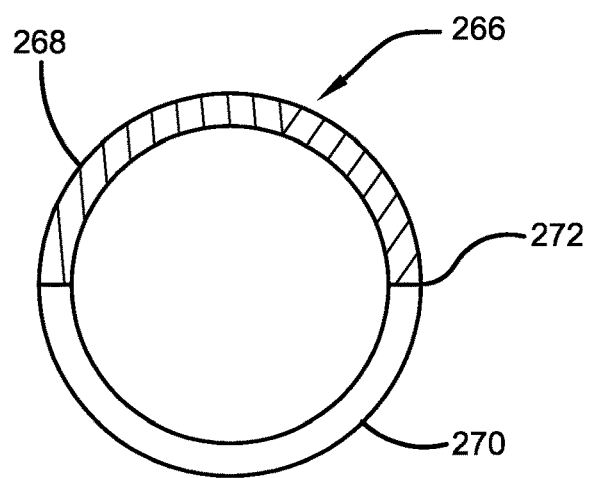
FIG. 21B is a top view schematic of the coil of FIG. 21A.

With reference to FIG. 21A, one or more embodiments may utilize a coil 266 having both a first electrode, e.g. positive electrode, and a second electrode, e.g. grounded electrode. Coil 266 includes a porous layer portion 268 employed as a first electrode, e.g. positive electrode, and a hollow portion 270 employed as a second electrode, e.g. grounded electrode. A spacer 272 may be present between porous layer portion 268 and hollow portion 272. Fluid is able to flow within the coil itself and dispersed phase drops will coalesce in porous layer portion 268.

Figure 22A:
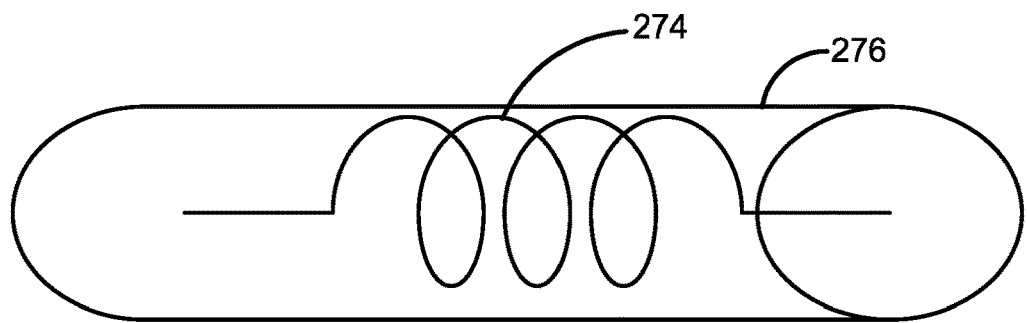
FIG. 22A is a side view schematic of a coil as a first electrode and a hollow cylindrical housing as a second electrode.
Figure 22B:
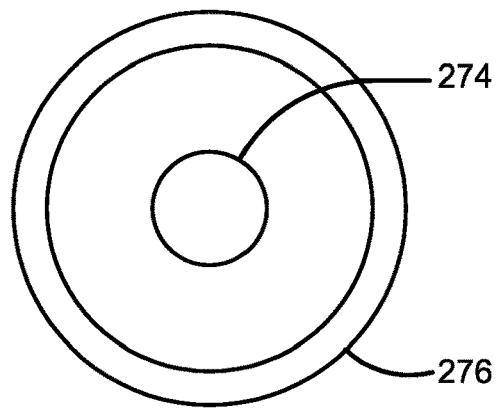
FIG. 22B is a top view schematic of the coil and housing of FIG. 22A.

With reference to FIG. 22A, one or more embodiments may utilize a coil 274 employed as a first electrode, e.g. positive electrode, within a cylindrical housing 276 employed as a second electrode, e.g. grounded electrode. Coil 274 is a porous layer and fluid will flow within cylindrical housing 276 and past and through pores in coil 274 and dispersed phase drops will coalesce in coil 274.

Figure 23:
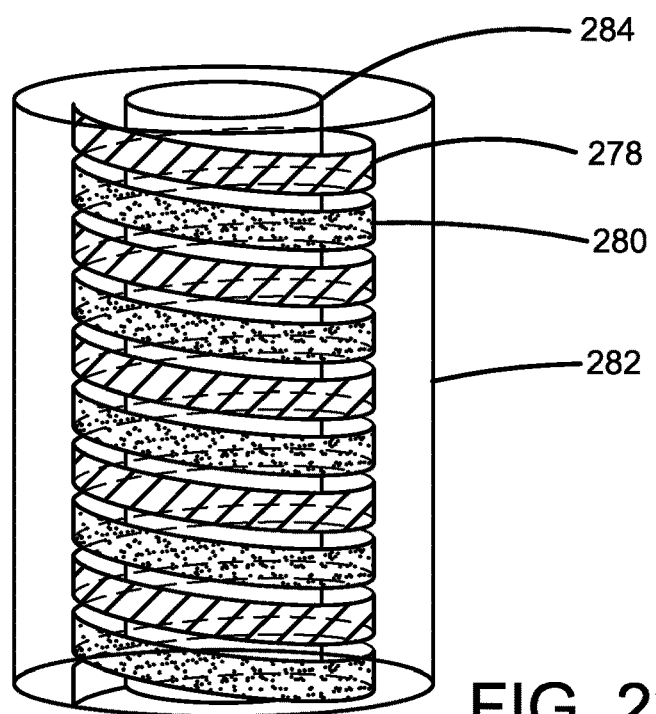
FIG. 23 is a schematic of two coils within a hollow cylindrical housing.

With reference to FIG. 23, one or more embodiments may utilize a first coil 278 and a second coil 280 within a cylindrical housing 282. Cylindrical housing 282 may include an inner cylindrical portion 284 to thereby form a concentric flow path. In one or more embodiments, first coil 278 may be employed as a first electrode, e.g. positive electrode, and second coil 280 may be employed as a second electrode, e.g. grounded electrode. In one or more embodiments, cylindrical housing 282 may be employed as a first electrode, e.g. positive electrode, and inner housing 284 may be employed as a second electrode, e.g. grounded electrode. First coil 278 and a second coil 280 are porous layers and fluid will flow within cylindrical housing 282 and past and through pores in first coil 278 and a second coil 280 and dispersed phase drops will coalesce in first coil 278 and a second coil 280.

As used herein, the term porous layer (e.g. porous layer 34 and cylindrical porous layer 88) is to be interpreted broadly as including at least one layer of porous material. In one or more embodiments, a porous layer may be embodied by a plurality of layers of porous material. As used herein, the term porous layer may be defined as including one or more layers of porous material that allow the flow of a fluid to pass therethrough.

Porous layers (e.g. porous layer 34 and cylindrical porous layer 88) described herein may be made from a substrate selected from the group consisting of metal, intrinsically conductive polymers, polymers with electrically conductive coatings, glass fibers, carbon fibers, graphite fibers, semiconductor materials, and textiles. Exemplary metals include stainless steel, copper, aluminum, iron, gold, silver, tungsten, nickel, tin, bronze, platinum, zinc, chromium, nichrome alloys, and titanium. Exemplary intrinsically conductive polymers include polyaniline, polypyrrole, and polythiophene. Exemplary semiconductor materials include polystyrene-co-methacrylate, germanium, silica, silicone, and graphite. Exemplary textiles include cellulose and nylon (synthetic polymers based on aliphatic or semi-aromatic polyamides).

Figure 8:
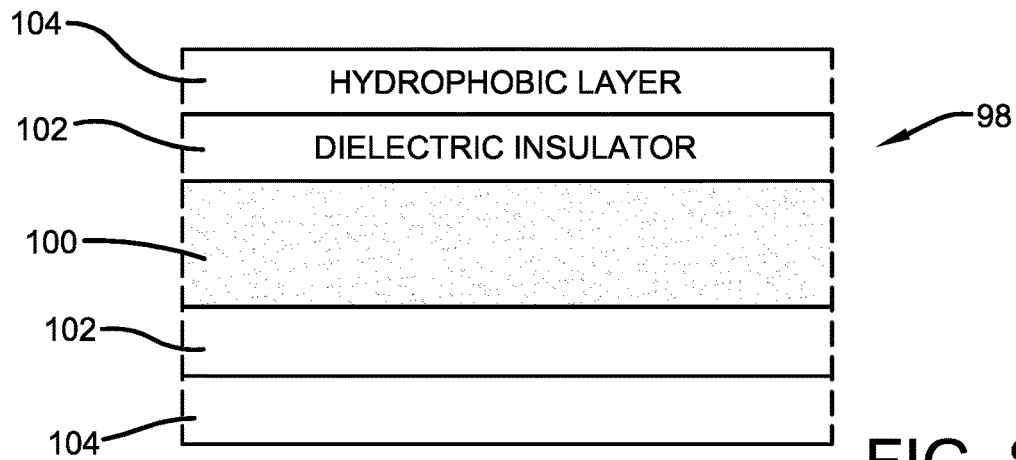
FIG. 8 is a cross-sectional schematic of a coating on a porous layer.

In one or more embodiments, porous layers (e.g. porous layer 34 and cylindrical porous layer 88) described herein may include one or more additional layers on the substrate. The one or more additional layers may be coating layers. With reference to FIG. 8, a porous layer, generally represented by the numeral 98, includes a substrate 100 and a first additional layer 102 on the substrate. First additional layer 102 may be a dielectric layer. Exemplary materials for a dielectric layer include poly(styrene-co-methyl methacrylate) (PS/PMMA), Teflon™ (Polytetrafluoroethyline (PTFE)), Parylene™ (poly(p-xylylene) polymers), silicon dioxide, and the like. In one or more embodiments, a dielectric layer is hydrophobic, and therefore a second additional layer may not be necessary.

In one or more embodiments, coated porous layer 98 includes a second additional layer 104 on first additional layer 102. Second additional layer 104 may be a hydrophobic layer. Exemplary materials for a hydrophobic layer include fluoropolymer, Teflon™ (Polytetrafluoroethyline (PTFE)), and the like. An exemplary fluoropolymer may be obtained commercially as FluoroPel™ 1601V, which is a one percent fluoropolymer solution in a fluorosolvent. First additional layer 102 or second additional layer 104 may also be made hydrophobic or superhydrophobic by texturing the surface using surface morphology techniques.

Figure 9:
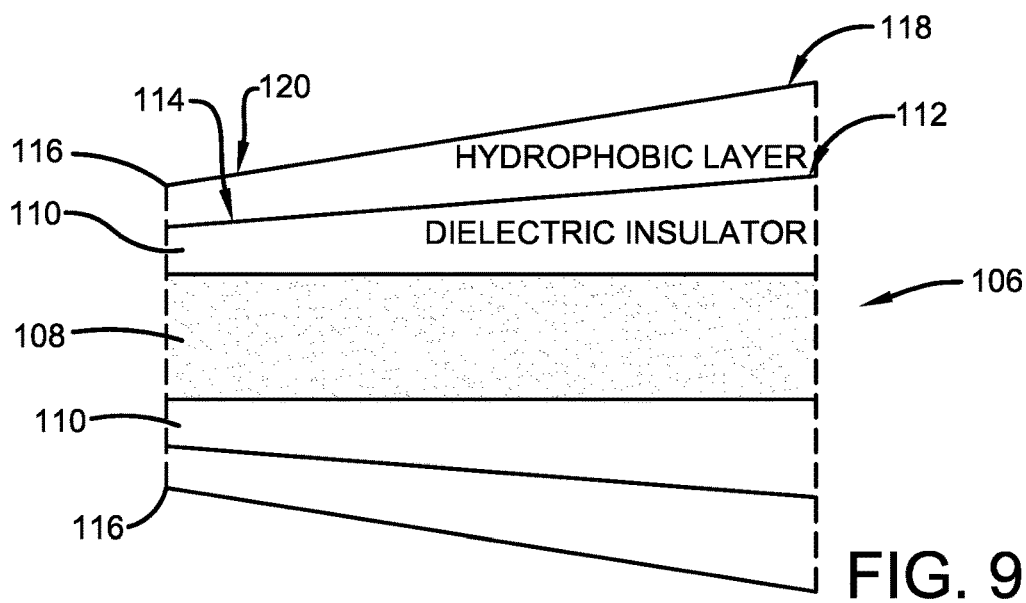
FIG. 9 is a cross-sectional schematic of a gradient coating on a porous layer.

In one or more embodiments, porous layers (e.g. porous layer 34 and cylindrical porous layer 88) described herein may include one or more additional layers on the substrate, where the one or more additional layers are formed as a gradient having a thicker portion and a thinner portion. With reference to FIG. 9, a porous layer, generally represented by the numeral 106, includes a substrate 108 and a first additional gradient layer 110 on substrate 108. First additional gradient layer 110 may be a dielectric layer, as described above. First additional gradient layer 110 includes a thicker portion 112 extending as a gradient to a thinner portion 114. The gradient of additional gradient layer 110 may be formed based on utilization of a particular method of applying additional gradient layer 110. In one or more embodiments, thicker portion 112 may be about 10 times, and in other embodiments, about 5 times, as thick as thinner portion 114. In one or more embodiments, thicker portion 112 may be from 1 to 5 times as thick as thinner portion 114. In one or more embodiments, thicker portion 112 may be at least 2 times, and in other embodiments, at least 5 times as thick as thinner portion 114.

Porous layer 106 may further include a second additional gradient layer 116 on first additional gradient layer 110. Second additional gradient layer 116 may be a hydrophobic layer, as described above. Second additional gradient layer 116 includes a thicker portion 118 extending as a gradient to a thinner portion 120. The gradient of second additional gradient layer 116 may be formed based on utilization of a particular method of applying second additional gradient layer 116. In one or more embodiments, a first additional layer may be formed as a non-gradient layer and a second additional layer may be formed as a gradient layer. In one or more embodiments, thicker portion 118 may be about 10 times, and in other embodiments, about 5 times, as thick as thinner portion 120. In one or more embodiments, thicker portion 118 may be from 1 to 5 times as thick as thinner portion 120. In one or more embodiments, thicker portion 118 may be at least 2 times, and in other embodiments, at least 5 times as thick as thinner portion 120.

First additional gradient layer 114 and second additional gradient layer 116 may be utilized to cause the coalesced droplets to move in a direction from the thicker portion toward the thinner portion.

It should be appreciated that FIG. 8 and FIG. 9 are representative cross-sectional views of the porous layers, and that porous layers having one or more additional layers may be entirely surrounded by the additional layers. That is, even though FIG. 8 and FIG. 9 do not show the one or more additional layers covering each end of the substrate, techniques for applying the one or more additional layers will generally cover each end of the substrate with the one or more additional layers.

In one or more embodiments, pores of porous layers (e.g. porous layer 34 and cylindrical porous layer 88) described herein may be formed by any suitable method. Porous layers may be woven or non-woven. In one or more embodiments, porous layers are woven mesh, such as woven metal mesh. An exemplary woven metal mesh is stainless steel woven mesh. In one or more embodiments, porous layers are non-woven randomly oriented fibers. In one or more embodiments, porous layers may be formed by sintering, such as sintering metal sheets made from small metal particles sintered together. In one or more embodiments, porous layers may be formed by perforating a substrate to provide the substrate with pores.

In one or more embodiments, porous layers (e.g. porous layer 34 and cylindrical porous layer 88) described herein may be characterized by pore size. In one or more embodiments, porous layers described herein may be characterized by the pore size of a first porous layer relative to the pore size of a second porous layer. As mentioned above, each subsequent porous layer in the flow path may have pore sizing that is greater than the pore sizing of the prior porous layer. This enables coalescence of the increasing-in-size droplets.

In one or more embodiments, a subsequent porous layer in the flow path may have mean average pore sizing that is at least 2 times greater, in other embodiments, at least 5 times greater, and in other embodiments, at least 10 times greater, than the mean average pore sizing of the prior porous layer.

Pore size may be defined by porosity, which is a measure of the void spaces in a material, and is a fraction of the volume of voids over the total volume, between 0 and 1. In one or more embodiments, porous layers have a porosity of from 0.5 to 0.999, in other embodiments, from 0.85 to 0.99, and in other embodiments, from 0.9 to 0.999.

In embodiments where porous layers are woven mesh, pore size may be characterized by mesh count, which refers to the number of openings per linear inch. In one or more embodiments, porous layers have a mesh count of 40×40 or less, in other embodiments, 30×30 or less, in other embodiments, 20×20 or less, and in other embodiments, 10×10 or less. In one or more embodiments, porous layers have a mesh count of 10×10 or more, in other embodiments, 20×20 or more, in other embodiments, 30×30 or more, and in other embodiments, 40×40 or more. Any of these mesh count end points may be utilized to form suitable ranges. In one or more embodiments, porous layers have a mesh count of 10×10, in other embodiments, 20×20, in other embodiments, 30×30, and in other embodiments, 40×40.

In one or more embodiments, pore size of the porous layers may be characterized relative to the size of the droplets passing through the porous layers. In one or more embodiments, mean average pore size of the porous layers may be from 1 to 3 times the mean average size of the droplets passing through the porous layers. The mean average pore size of the porous layers may be anywhere suitable in the range of from 0.1 to 100 times the mean average size of the droplets passing through the porous layers.

In one or more embodiments, porous layers (e.g. porous layer 34 and cylindrical porous layer 88) described herein may be characterized by the distance between a first porous and a second porous layer, that is, the distance between a first electrode and a second electrode. In one or more embodiments, the distance between a first porous employed as a first electrode and a second porous layer employed as a second electrode may be from about 0.1 mm to about 4 mm, in other embodiments, from about 0.4 mm to about 2 mm, and in other embodiments, from about 0.6 mm to about 1 mm. In one or more embodiments, the distance between a first porous employed as a first electrode and a second porous layer employed as a second electrode may be 2 mm or less, in other embodiments, 1.5 mm or less, and in other embodiments, 1 mm or less.

Figure 10:
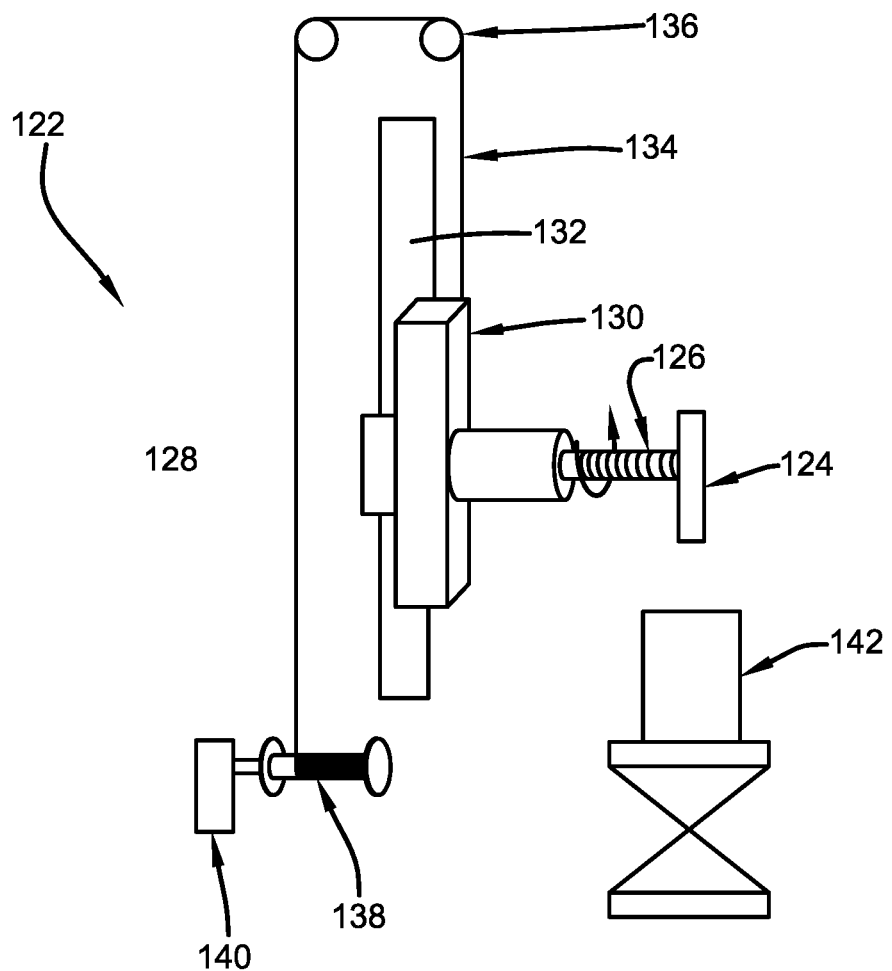
FIG. 10 is a schematic of an assembly for coating a porous layer.

In one or more embodiments, the distance between a first porous and a second porous layer may be characterized relative to the size of the droplets passing through the porous layers. In one or more embodiments, the distance between a first porous employed as a first electrode and a second porous layer employed as a second electrode may be about 1 to 100, in other embodiments, about 1 to 10 times, the size of the average drop passing through the porous layers.

Where one or more additional layers are provided as a coating, any suitable coating technique may be utilized. With reference to FIG. 10, an exemplary coating technique utilizes an apparatus 122 for coating one or more additional layers on a substrate. Coating apparatus 122 includes a porous layer 124 coupled at its center with a rod 126 that acts as, or is further coupled with, a shaft of a motor 128. Motor 128 controls the rotation of porous layer 124. Motor 128 is coupled with a glide 130 that may travel on rails 132. Glide 130 is coupled with an end of a line 134 in order to enact vertical travel of glide 130 on rails 132. Line 134 may be utilized with one or more pulleys 136 and be further coupled at the other end with a take-up reel 138. Take-up reel 138 is coupled with a second motor 140 which causes line 138 and glide 130 to travel.

The vertical travel of glide 130 and porous layer 124 allows porous layer 124 to reach a container 142 including a coating solution. The coating solution may include a polymer, desired as the coating, in a solvent to form the coating solution. Exemplary solvents include toluene, tetrachloroethylene, methyl acetate, hexane, dimethylformamide, water, and acetone. The selection of the solvent depends on the nature of the polymer to be dissolved.

When a portion of porous layer 124 is in coating solution in container 142, motor 128 causes porous layer 124 to rotate to coat the desired portion of porous layer. The distance of vertical travel controls where the coating is placed on porous layer 124 and the time porous layer is in container 142 may control thickness of the additional layer. The rate of vertical movement may allow for a gradient additional layer to be formed. Where a first additional layer and a second additional layer are desired, container 142 may be first provided with a first coating solution to apply the first additional layer and then container 142 may be provided with a second coating solution to apply the second additional layer.

In one or more embodiments, a coating technique, such as the utilization of coating apparatus 122, may be characterized by one or more parameters of coating solution immersion time, rotation rate of the porous layer, concentration of the coating solution, and drying time. These parameters may be adjusted to achieve suitable coalescence at a low applied electric potential voltage, where low applied electric potential voltage may be defined as less than 250 volts, or in other embodiments, less than 150 volts. These parameters may also be adjusted to achieve a desired thickness or gradient for the one or more additional layers.

In one or more embodiments, the coating solution immersion time may be in a range of from about 5 seconds to about 60 seconds, in other embodiments, from about 10 seconds to about 30 seconds, and in other embodiments, from about 12 seconds to about 20 seconds. In one or more embodiments, the coating solution immersion time may be about 15 seconds.

In one or more embodiments, the rotation rate of the porous layer may be in a range of from about 1 RPM to about 15 RPM, in other embodiments, from about 3 RPM to about 12 RPM, and in other embodiments, from about 5 RPM to about 10 RPM. In one or more embodiments, the rotation rate of the porous layer may be about 7 RPM.

In one or more embodiments, the concentration of the coating solution may be in a range of from about 5 wt. % to about 30 wt. % coating, in other embodiments, from about 10 wt. % to about 20 wt. % coating, and in other embodiments, from about 13 wt. % to about 17 wt. % coating, with the remainder solvent. In one or more embodiments, the concentration of the coating solution may be about 15 wt. % coating, with the remainder solvent.

In one or more embodiments, the drying time may be about 1 day, in other embodiments, about 2 days, and in other embodiments, about 3 days.

In one or more embodiments, additional layers described herein (e.g. additional layer 102 and first additional gradient layer 110) may be characterized by the thickness of the additional layer. In one or more embodiments, the thickness of an additional layer is in the range of from 10 micrometers or more to 100 micrometers or less, in other embodiments, from 15 micrometers or more to 40 micrometers or less, and in other embodiments, from 20 micrometers or more to 30 micrometers or less.

Figure 16:
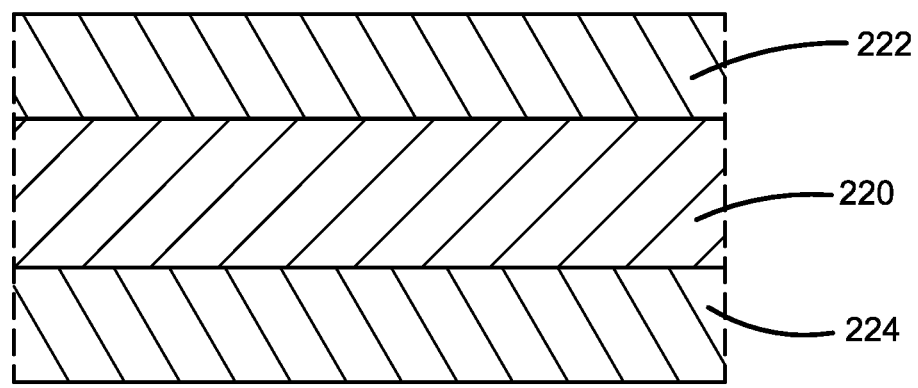
FIG. 16 is a schematic showing a spacer layer between a first electrode and a second electrode.

With reference to FIG. 16, in one or more embodiments, an electrowetting coalescence device may include a spacer layer 220 positioned between a first porous layer 222, which may be a first electrode, and a second porous layer 224, which may be a second electrode. Any of the herein described embodiments may include a spacer layer 220. As shown in FIG. 16, in one or more embodiments, spacer layer 220 spans the entire distance between first porous layer 222 and second porous layer 224. In other embodiments, there may be a spacing between spacer layer 220 and first porous layer 222 and between spacer layer 220 and second porous layer 224.

Spacer layer 220 may be provided to prevent first porous layer 222 and second porous layer 224 from contacting each other, thereby short circuiting. Spacer layer 220 may be made from a polymer or any suitable material. Spacer layer 220 may be woven or non-woven. Spacer layer 220 may be an electrospun polymer layer.

In one or more embodiments, spacer layer 220 may have a thickness of less than 2 mm, in other embodiments, less than 1.5 mm, and in other embodiments, less than 1 mm. In one or more embodiments, spacer layer 220 may have a thickness of from about 0.5 mm to about 2 mm, and in other embodiments, from about 0.7 mm to about 1.3 mm. In one or more embodiments, spacer layer 220 may have a thickness of about 1.5 mm, in other embodiments, about 1.3 mm, in other embodiments, about 1.1 mm, and in other embodiments, about 1 mm.

In one or more embodiments, spacer layer 220 may have a mean average pore size of less than 6 mm, in other embodiments, less than 5 mm, and in other embodiments, less than 4 mm. In one or more embodiments, spacer layer 220 may have a mean average pore size of from about 2.5 mm to about 5 mm, and in other embodiments, from about 3 mm to about 4 mm. In one or more embodiments, spacer layer 220 may have a mean average pore size of about 4 mm, in other embodiments, about 3 mm, in other embodiments, about 2 mm, and in other embodiments, about 1 mm.

In one or more embodiments, an electrowetting coalescence device may include a particular housing for retaining the porous layers. Any of the herein disclosed housings may be made from suitable electrically insulating material.

Figure 11:
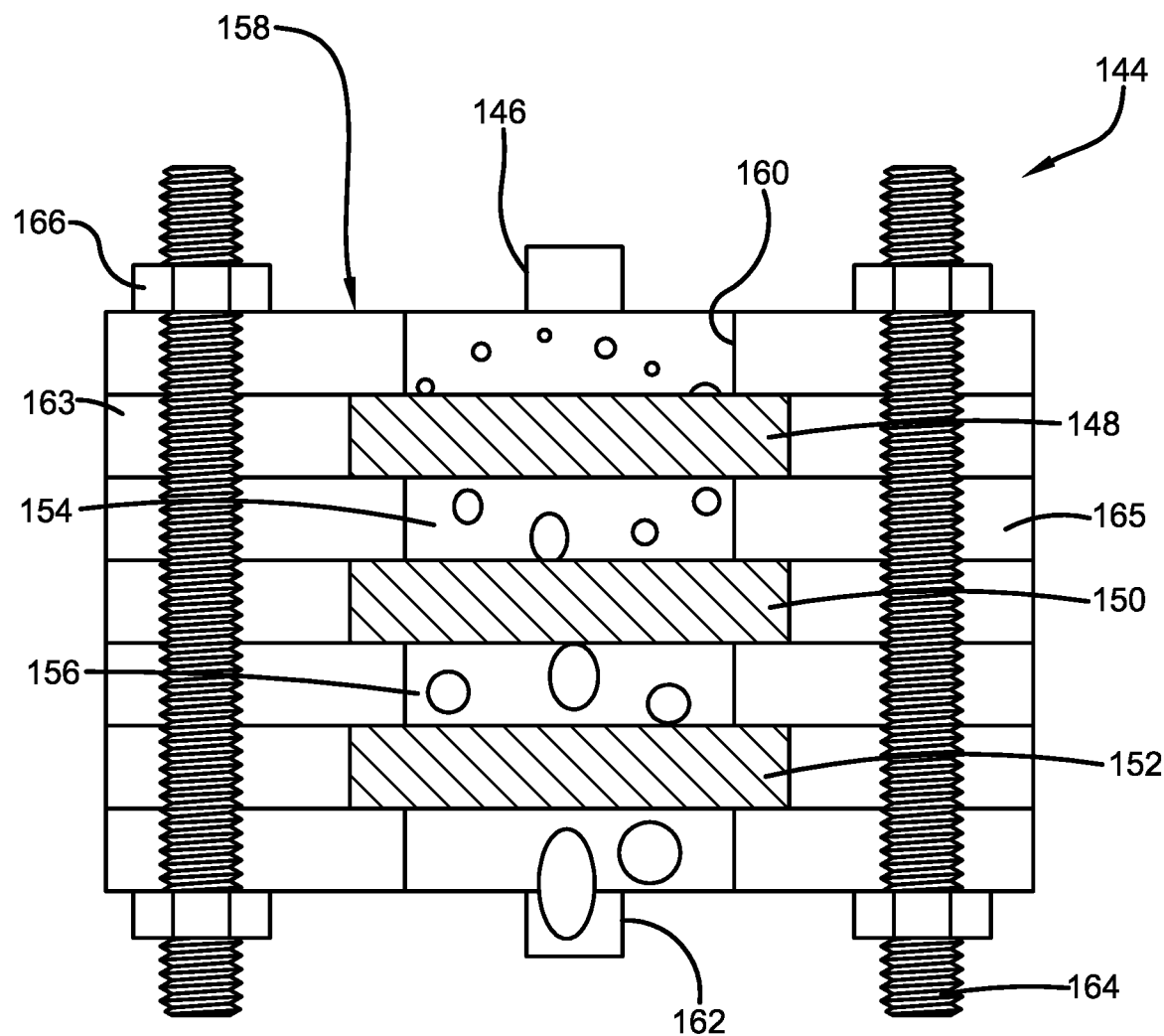
FIG. 11 is a cross-sectional schematic of an electrowetting coalescence device, showing a housing.

With reference to FIG. 11, an electrowetting coalescence device, generally represented by the numeral 144, includes an inlet 146 in fluid communication with a first porous layer 148, a second porous layer 150, and a third porous layer 152. First porous layer 148, second porous layer 150, and third porous layer 152 are shown as flat sheets, where the flat sheets are parallel, or substantially parallel, with each other. Second porous layer 150 may be employed as a first electrode. First porous layer 148 and third porous layer 152 may be employed as a second electrode and a third electrode. This creates a first electric field between first porous layer 148 and second porous layer 150 and a second electric field between second porous layer 150 and third porous layer 152. A first insulating gap 154 exists between first porous layer 148 and second porous layer 150 and a second insulating gap 156 exists between second porous layer 150 and third porous layer 152 to prevent short circuiting of the electric fields. It should be appreciated that the operation of and further details of electrowetting coalescence device 144 can be generally related to the above description of electrowetting coalescence device 30 in FIG. 2, and are therefore not repeated here, except to describe the embodiment of FIG. 11 showing a housing 158.

Housing 158 of electrowetting coalescence device 144 includes a flow path 160 between inlet 146 and an outlet 162. Housing 158 further serves to retain first porous layer 148, second porous layer 150, and third porous layer 152 in relative position. Each of first porous layer 148, second porous layer 150, and third porous layer 152 are positioned within a respective support 163. Each support 163 functions to ensure first porous layer 148, second porous layer 150, and third porous layer 152 can serve as a corresponding electrode. A spacer 165 is positioned between each corresponding pair of supports 163 and at each end of the endmost supports 163. The inner diameter of each spacer 165 defines flow path 160. One or more threaded rods 164, such as nylon rods, may be positioned through each spacer 165 and each support 163. Fasteners 166 may be utilized to secure each threaded rod 164 in relative position, thereby securing all components in relative position.

Figure 12:
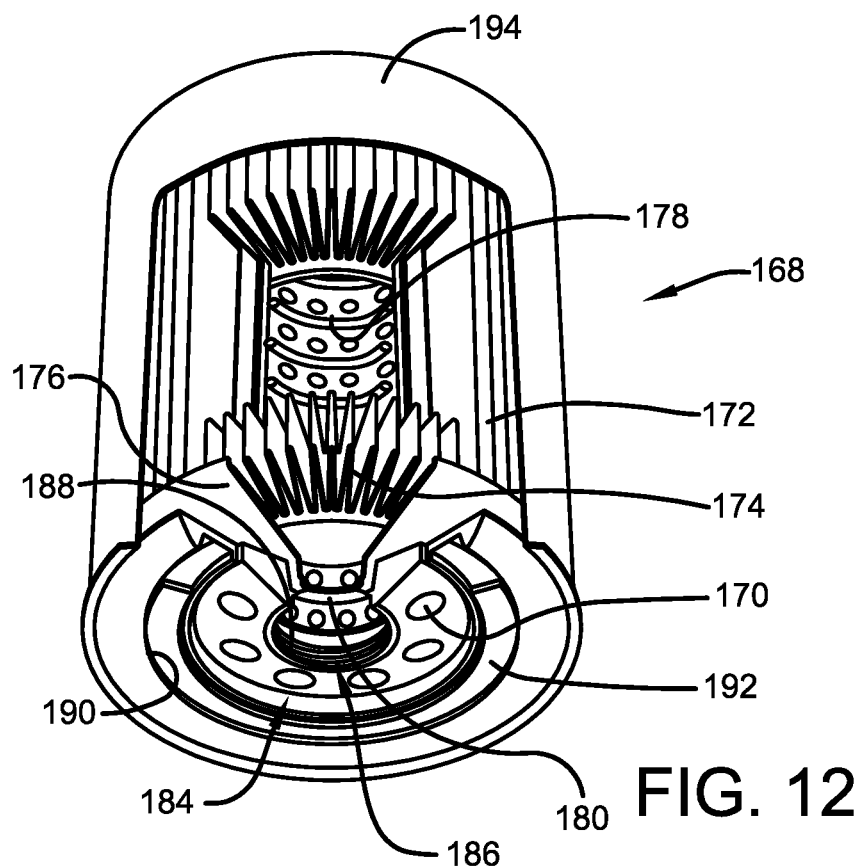
FIG. 12 is a cutaway schematic of an electrowetting coalescence device, showing a spin-on housing.

With reference to FIG. 12, an electrowetting coalescence device, generally represented by the numeral 168, may be described as a spin-on cartridge 168. Spin-on cartridge 168 includes one or more circularly-spaced inlet openings 170 in fluid communication with a cylindrical porous layer 172. As disclosed above, electrowetting coalescence device 168 may include any suitable number of cylindrical porous layers. Each cylindrical porous layer (e.g. cylindrical porous layer 172) includes opposing ends 174 that may be fixed to a respective endcap 176 to prevent flow of a fluid past the opposing ends 174.

A fluid having a continuous phase and a dispersed phase, in the form of small droplets, may be provided to one or more inlet openings 170. The one or more inlet openings 170 provide the fluid through a fluid channel and to the outer surface of cylindrical porous layer 172. The fluid proceeds to each subsequent cylindrical porous layer that is present. At least one of the cylindrical porous layers is employed as a first electrode, e.g. positive electrode, and at least one of the cylindrical porous layers proximate the first electrode is employed as a second electrode, e.g. grounded electrode, to form an electric field. The small droplets of the dispersed phase will be attracted to cylindrical porous layer 172 and will coalesce to form larger droplets.

The larger droplets will continue to coalesce in any additional cylindrical porous layers until passing through to an outlet flow channel 178. Outlet flow channel 178 provides the continuous phase and the coalesced droplets to an outlet 180. The coalesced droplets may collect in a drain for eventual removal. In these or other embodiments, the flow from outlet 180 may be provided to a downstream apparatus, such as a barrier filter, for removal of the coalesced droplets from the continuous phase.

For positioning spin-on cartridge 168 in a respective position, such as on a threaded post 182 (FIG. 13), spin-on cartridge 168 includes a face 184 having a centrally-positioned threaded opening 186. Threads 188 of threaded opening 186 are adapted to mate with threads of threaded post 182. Face 184 further includes an outer seal 190 and may include a sealing gasket 192 to force flow of a fluid into one or more inlet openings 170 and to prevent leakage of a fluid past sealing gasket 192 and outer seal 190. Sealing gasket 192 may further assist with ease of installation and removal of spin-on cartridge 168. Outer seal 190 is coupled with a housing 194 and housing 194 extends from outer seal 190 to enclose all components of spin-on cartridge 168.

Figure 13:
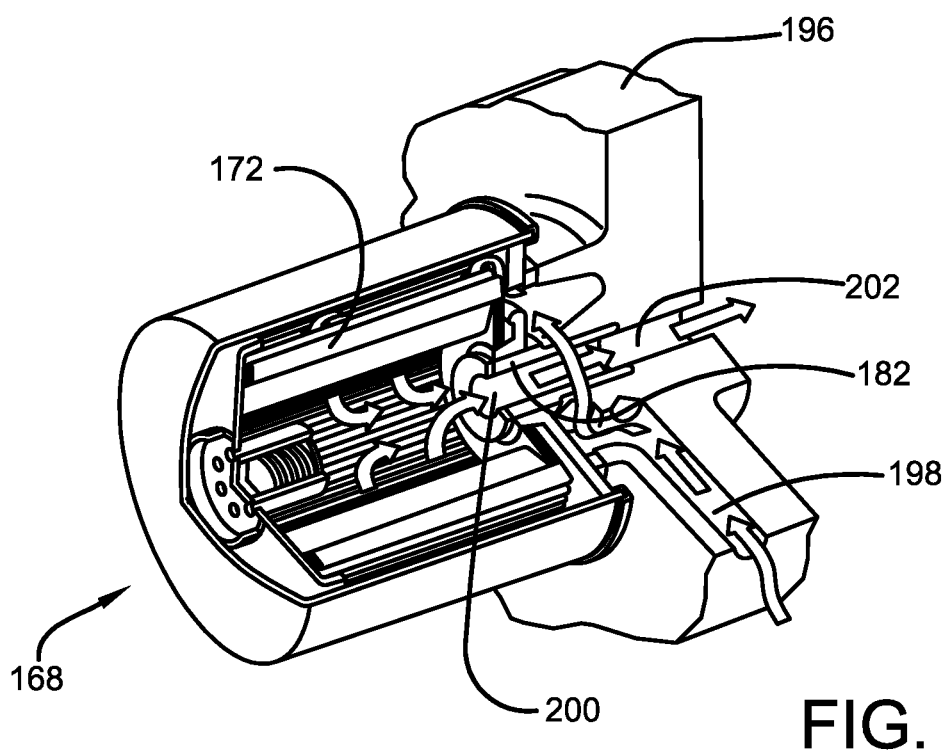
FIG. 13 is a cutaway schematic of an electrowetting coalescence device, showing a spin-on housing.

With reference to FIG. 13, spin-on cartridge 168 is shown with threads 188 of threaded opening 186 mated with threads of threaded post 182. Threaded post 182 is coupled with a component 196, which may be an engine component 196. Component 196 includes an inlet channel 198 providing the fluid to one or more inlet openings 170. After the fluid flows through the cylindrical porous layers, outlet flow channel 178 provides the fluid, including the coalesced droplets, to an outlet channel 200 within threaded post 182 and to an ultimate outlet 202 for providing fluid to a downstream location.

It should be appreciated that the operation of and further details of electrowetting coalescence device 168 can be generally related to the above description of electrowetting coalescence devices.

In one or more embodiments, an electrowetting coalescence device may include a housing 250 shaped as a single hollow frustoconical shape. A wider portion 252 may extend to a narrow portion 254 to form the hollow frustoconical shape. Housing 250 may include a single porous layer 256 shaped as a hollow cone as a first electrode, e.g. positive electrode. Housing 250 may be employed as a second electrode, e.g. a grounded electrode based on housing 250 having one or more grounded connections 258. The operation of such embodiments is as disclosed elsewhere herein.

In one or more embodiments, an electrowetting coalescence device may include a housing 260 shaped as a partial spherocylinder. Housing 260 may include a single porous layer 262 having a corresponding shape and being employed as a first electrode. Housing 262 may be employed as a second electrode, e.g. a grounded electrode based on housing 260 having one or more grounded connections 264. The operation of such embodiments is as disclosed elsewhere herein.

One or more aspects of a housing of an electrowetting coalescence device may be disclosed in U.S. Pat. Nos. 8,590,712; 8,096,423; 4,512,882; and 4,253,954; and U.S. Publication Nos. 2013/0153487 and 2011/0168621, which are each incorporated herein by reference.

In one or more embodiments, an electrowetting coalescence device may be characterized by flow rate through the electrowetting coalescence device. Flow rate may affect droplet capture and droplet break-up. If the face velocity is too high, small drops tend to not be captured and large drops tend to break into small drops. Face velocity (flow rate divided by filter area) may be reduced by making the area larger. In one or more embodiments, face velocity through an electrowetting coalescence device may be from 0.1 cm/min or more to 10 cm/min or less. In one or more embodiments, face velocity through an electrowetting coalescence device may be from 1 cm/min or more to 3 cm/min or less.

In one or more embodiments, an electrowetting coalescence device may be characterized by pressure drop across the electrowetting coalescence device. In one or more embodiments, an electrowetting coalescence device has a pressure drop of from 0.5 kPa or more to 15 kPa or less. In one or more embodiments the pressure drop may be 2 kPa or more to 4 kPa or less.

As used herein, the term electrode (e.g. first porous layer 14 employed as a first electrode) is to be interpreted broadly as including at least one electrode. In one or more embodiments, inasmuch as a porous layer may be embodied by a plurality of layers of porous material, an electrode may also be embodied by a plurality of electrodes that may be operated independently. As used herein, the term electrode may be defined as including one or more materials that allow the flow of electricity to pass therethrough.

In one or more embodiments, positive electrodes described herein may be characterized based on the applied voltage provided to the positive electrode. In one or more embodiments, the applied voltage provided to a positive electrode may be in a range of from about 20 V to about 500 V, in other embodiments, from about 200 V to about 450 V, and in other embodiments, from about 350 V to about 400 V. In one or more embodiments, the applied voltage provided to a positive electrode may be about 380 V. In one or more embodiments, the applied voltage provided to a positive electrode may be in a range of from about 80 V to about 200 V, in other embodiments, from about 100 V to about 150 V, and in other embodiments, from about 110 V to about 130 V.

In one or more embodiments, the applied voltage provided to a positive electrode may be less than 250 V, in other embodiments, less than 150 V, in other embodiments, less than 125 V, and in other embodiments, less than 100 V. In these or other embodiments, the applied voltage provided to a positive electrode may be more than 20 V, in other embodiments, more than 50 V, and in other embodiments more than 75 V.

In one or more embodiments, the applied voltage provided to a positive electrode does not cause an electric field to exceed the breakdown voltage/length of a substrate or of a coating on a substrate. In one or more embodiments, the applied voltage provided to a positive electrode is provided continuously.

As generally known to the skilled person, a grounded electrode provides a zero-voltage reference point for an electrical system. In one or more embodiments, the voltage between a positive electrode and a grounded electrode may therefore be characterized as any of the above described applied voltages provided to a positive electrode.

As shown in FIG. 1, any of the herein described embodiments may utilize threaded screws 33 held in place by securing device 35, such as a nut 35, for electrical communication with a porous layer and employing the porous layer as a positive electrode, a grounded electrode, or a negative electrode. As generally known to those skilled in the art, other techniques for providing positive charge to a positive electrode, providing negative charge to a negative electrode, and for grounding a grounded electrode may be suitable.

Any suitable methods for providing positive charge or negative charge may be utilized. In one or more embodiments, DC is utilized. In one or more embodiments, pulsed DC is utilized. In one or more embodiments, AC is utilized. Where utilized, AC may assist with avoiding chain formation of the coalescing droplets.

Without being bound by any theory, electrowetting coalescence devices disclosed herein operate by inducing charge on the dispersed phase droplets. This induced charge results in polarization of individual droplets and each drop acts a dipole. After polarization, each drop starts feeling attracting and repelling forces from oppositely and similarly charged droplets, respectively. When two oppositely polarity droplets come together, the thin film existing between the drops gets thinner and thinner due to the coupled electrostatic and molecular forces. Once these forces overcome the interfacial forces acting on each drop near colliding faces, the drops merge together and form a bigger droplet. Migratory coalescence occurs when drops possess inherent charges. The electric field influences these inherent charges that not only drive the drops closer but ruptures the thin film faster. The drops get attracted to the oppositely charged electrode and when the drop sits on the electrode, it gains the electrode's charge. It becomes part of the electrode and starts attracting incoming water droplets. Other forces acting on the drops such as gravitational force and drag force can also affect the rate of coalescence. It may be desirable to prevent partial coalescence. Partial coalescence may be promoted by a strong electric field, so it may be desirable to utilize lower electric fields to prevent partial coalescence. It may also be desirable to prevent chain formation of the dispersed phase droplets. Without proper operation, a chain of the dispersed phase droplets may form and act as a bridge between the electrodes, leading to short circuiting. Chain formation may be reduced based on the utilization of a particular type of electrical field.

As disclosed herein, embodiments of the invention are particularly suitable for coalescing droplets of a dispersed phase contained within a continuous phase. In one or more embodiments, the continuous phase may be a first liquid and the dispersed phase may be a second liquid. In one or more embodiments, the continuous phase and the dispersed phase are immiscible liquids.

In one or more embodiments, the continuous phase may be a non-polar liquid and the dispersed phase may be a polar liquid. An exemplary polar liquid is water. Exemplary non-polar liquids include hydrocarbons. Exemplary hydrocarbons include diesel fuel, biodiesel fuel, lubricating oil, hydraulic oil, and transmission oil.

In one or more embodiments, the continuous phase may be a gas, such as air, and the dispersed phase may be a liquid, such as water or hydrocarbon mists.

In one or more embodiments, an electrowetting coalescence device may be suitable for coalescing droplets of the dispersed phase sized 100 μm or less, in other embodiments, 50 μm or less, and in other embodiments, 20 μm or less.

One or more embodiments of the present invention may be characterized by an amount of the dispersed phase coalesced and removed from the continuous phase following coalescing and removal of the dispersed phase in a downstream apparatus. In one or more embodiments, at least 95%, in other embodiments, at least 98%, in other embodiments, at least 99%, in other embodiments, at least 99.9%, of the dispersed phase may be coalesced and removed from the continuous phase.

One or more embodiments of the present invention may be characterized by particle size distribution of an inlet fluid compared to an outlet fluid. In one or more embodiments, an inlet fluid may have a particle size distribution of from one micron to about 100 microns, but with at least a majority of the drops in the range of 5 to 50 microns. In one or more embodiments, an inlet stream may have a mean average drop size of from about 10 microns to about 50 microns. In one or more embodiments, an outlet stream has droplets with a mean average particle size of from 50 to 200 microns. In one or more embodiments, an outlet stream has droplets with a mean average particle size of from 500 to 2000 microns. As the droplet size increases, the total number of droplets in the outlet stream will be much less than the inlet stream because of conservation of mass and volume where one large drop is equivalent in volume to a large number of small drops. In one or more embodiments, the number of enlarged drops and their size are increased as the run time increased, which means that it is a dynamic process.

As disclosed herein, embodiments of the invention provide the flow from an outlet of an electrowetting coalescence device to a downstream apparatus. The downstream apparatus may be particularly adapted to remove coalesced droplets from the outlet flow of an electrowetting coalescence device. Exemplary downstream apparatuses for removing coalesced droplets from the outlet flow of an electrowetting coalescence device include barrier filters, cyclones, absorbents, gravity settlers, centrifuges, impactors, lamella separators, inclined stacked plates, screens, and quiescent chambers. A plurality of downstream apparatuses may also be utilized.

Figure 24:
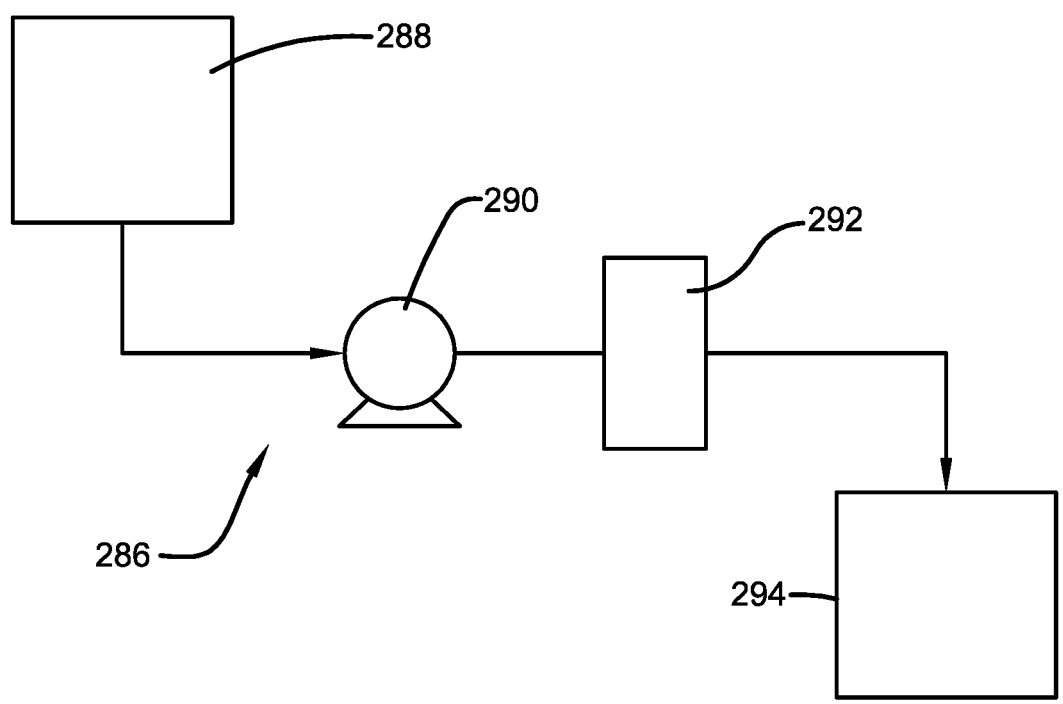
FIG. 24 is a schematic showing a downstream apparatus for removing large coalesced droplets.

With reference to FIG. 24, a system 286 includes a fluid source 288, such as a gas tank of a vehicle. A fuel pump 290 may provide the fluid to an engine (not shown). Before passing to the engine, the fluid may pass through an electrowetting coalescence device 292 for coalescing dispersed droplets within a continuous phase within the fluid. Electrowetting coalescence device 292 may provide the fluid having coalesced droplets of dispersed phase to a downstream apparatus 294 for removing the coalesced droplets.

It should be appreciated that the above described operation of an electrowetting coalescence device may be characterized as a method of coalescing droplets of a dispersed phase from a continuous phase. As disclosed above, a method may further include a downstream process step for removing the coalesced droplets.

Though above described embodiments generally relate to a device and method for removing droplets of a dispersed phase from a continuous phase, one or more embodiments of the invention may also be advantageous for other particular functions.

Figure 14:
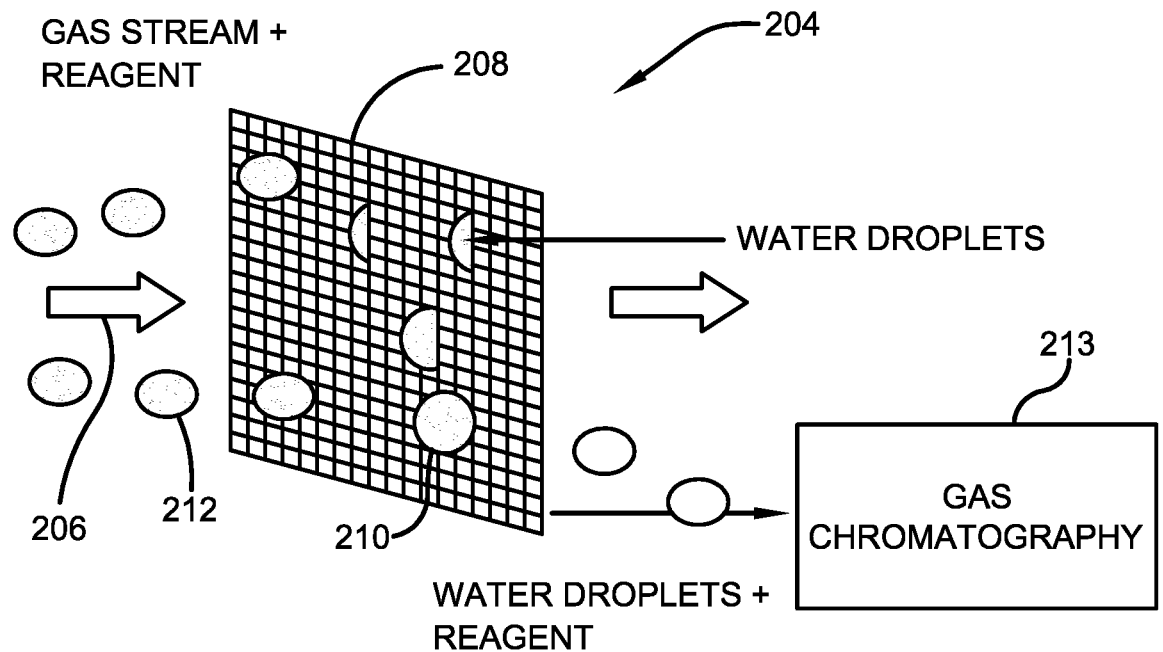
FIG. 14 is a schematic of a lab-on-a-chip apparatus.

With reference to FIG. 14, a lab-on-a-chip apparatus, generally represented by the numeral 204, includes an inlet flow 206 in fluid communication with a porous layer 208. Porous layer 208 is charged with an applied voltage. Based on the applied voltage, and the principles of electrowetting, electrolyte droplets 210 (e.g. water) are attracted to porous layer 208 by the forces that result from the applied voltage.

Inlet flow 206 is a gaseous stream including one or more reagents 212. As the gaseous stream including one or more reagents passes through porous layer 208, the one or more reagents 212 contact electrolyte droplets 210 that are held in position due to their attraction to porous layer 208 by the forces that result from the applied voltage. Electrolyte droplets 210 will continue to absorb the one or more reagents 212 until the applied voltage is removed from porous layer 208. Once the applied voltage is removed, the electrolyte droplets 210 containing the one or more reagents 212 will no longer be electrically attracted to porous layer 208 and will therefore drain. The drained material having the electrolyte droplets 210 containing the one or more reagents 212 can then be collected and provided to a gas chromatography machine 213 for analysis of the one or more reagents 212. The draining step may be automated based on analyzing electric potential in step-change form.

Porous layer 208 may utilize any of the above described details with respect to porous layers, for example, materials used to make porous layer 208 and pore sizes of porous layer 208. An exemplary material for porous layer 208 is stainless steel woven mesh.

Figure 15:
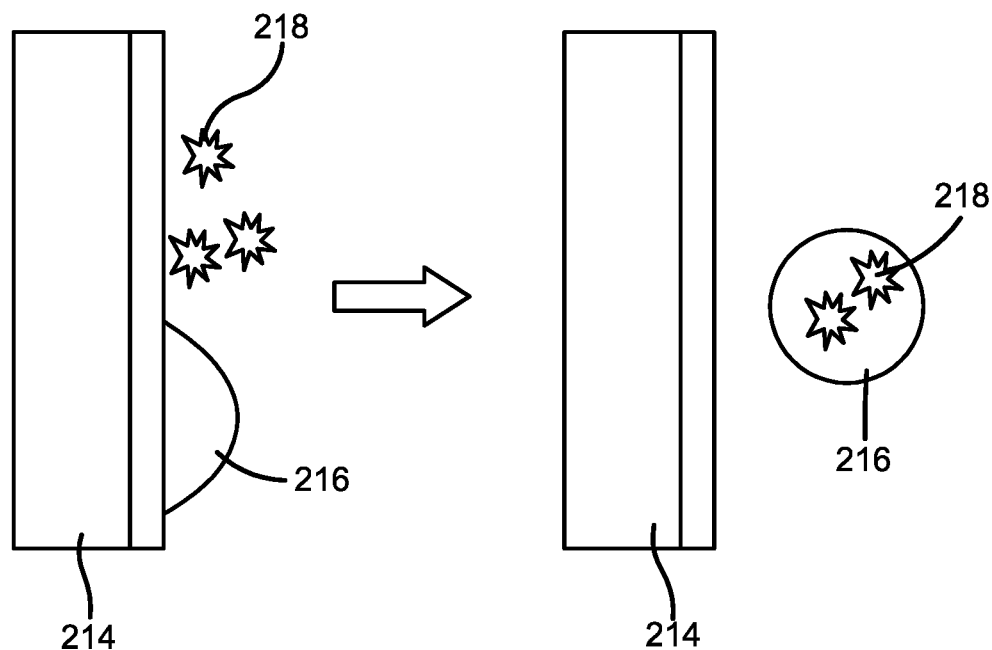
FIG. 15 is a schematic of an antifouling method.

One or more embodiments of the present invention may be utilized to prevent fouling of a solid surface. Fouling is the collection of unwanted materials on the solid surface that deteriorates the performance of the solid surface material. With reference to FIG. 15, porous layer 214 is charged with an applied voltage. Based on the applied voltage, and the principles of electrowetting, electrolyte droplets 216 (e.g. water) are attracted to porous layer 214 by the forces that result from the applied voltage. This causes the surface energy between electrolyte droplets 216 and the surface of porous layer 214 to decrease. In this state, electrolyte droplets 216 will then pick up and retain unwanted materials 218 (e.g. dirt particles). Once the applied voltage is removed, the electrolyte droplets 216 containing unwanted materials 218 will no longer be electrically attracted to porous layer 214 and will therefore drain. The drained material having the electrolyte droplets 216 containing unwanted materials 218 can then be collected and disposed.

Porous layer 214 may utilize any of the above described details with respect to porous layers, for example, materials used to make porous layer 214 and pore sizes of porous layer 214. An exemplary material for porous layer 214 is stainless steel woven mesh.

One or more embodiments of the present invention may be utilized to print on or dye certain materials. Generally, certain fabrics such as polyamide fabrics are hydrophobic to water and therefore reactive dye solutions containing water, reactive dye, and salt will tend to not penetrate the fabrics. In one or more embodiments, a fabric may be placed on a porous layer as described herein. At this time, the porous layer would not that be charged with an applied voltage. Then, a reactive dye solution containing water, reactive dye, and salt would be located on the fabric in a desired position for printing or dyeing the fabric. Once this occurs, the applied voltage may be provided to the porous layer in order to achieve electrowetting. The reactive dye solution would then be attracted to the porous layer and would therefore penetrate the fabric that is placed on the porous layer. Thus, the fabric would be printed on or dyed.

One or more embodiments of the present invention have industrial applicability as providing an electrowetting coalescence device suitable for separating droplets of a dispersed phase from a continuous phase. One or more embodiments may be particularly suitable for use with one or more of diesel engines, aircraft engines, boat engines, spacecraft, and storage tanks.

In light of the foregoing, it should be appreciated that the present invention advances the art by providing an improved electrowetting coalescence device and corresponding methods of operation. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXAMPLE

A stainless steel mesh purchased from McMaster-Carr was utilized in an electrowetting coalescence device. A first layer of the mesh was used as a positive electrode and a second layer of the mesh was used as a grounded electrode. The dielectric solution, 15% wt/wt % solution of poly (styrene-co-methyl methacrylate) (PS/PMMA), was prepared by dissolving PS/PMMA pellets in toluene (ACS reagent 99.5%, MW: 92.14 g/mol). The solution was stirred at 200 RPM using magnetic stirrer for 24 hours at room temperature. The coating was applied on the mesh using a dip coating technique and the coating was allowed to dry for 24 hours at room temperature. After the dielectric coating, the insulating layer was applied by using the same coating technique. Fluropel 1601V (Cytonix, Maryland) was used for the insulating layer.

Water was mixed with diesel in an upstream tank. The mixture was stirred vigorously using an overhead mechanical stirrer for well mixing. A 3500 rpm diesel fuel transfer pump (E3309, Airtex) was used to pump the mixture in the loop from the upstream tank. The flow was cycled back to the upstream tank through the pump for 30-40 minutes prior to directing to the electrowetting coalescence device, to generate relatively steady drop size distribution. The pump caused the larger water drops to break into a fine dispersion of droplet sizes less than 100 microns. After 30 min of recycle, a part of the mixture was passed through the electrowetting coalescence device. A pressure transducer was attached across the electrowetting coalescence device to measure the pressure drop. Samples were collected from the upstream and downstream sides of the electrowetting coalescence device at 10 min of time interval and were measured for the drop size distribution using a particle size analyzer (Accusizer 780/SIS).

The coalescence performance was tested by analyzing the increase in the water drop size in the downstream compared to the upstream. The volume averaged mean diameter of upstream and downstream were calculated and compared. The fraction of enlarged water drops in the downstream after 60 minutes was found to be 85% of upstream. This means that 85% of water drops coalesced and got separated from emulsion due to gravity because of their large size. The small droplets were measured by the particle size analyzer and the enlarged droplets were measured manually using a microscope. Images of different downstream samples were also taken at different time intervals. The number of enlarged drops and their size increased as the run time increased. This means that it was a dynamic process.

In another test, for an upstream volume averaged drop size of 40 micron, it was found that when no voltage was applied, the drop size in the downstream remained the same, which means that there was no breakage or coalescence of drops at 0 voltage, and when the potential was 125 V, the average drop size was found to be increased to approximately 1500 micron.

Various modifications and alterations that do not depart from the scope and spirit of this invention will become apparent to those skilled in the art. This invention is not to be duly limited to the illustrative embodiments set forth herein.

What is claimed is:

1. An electrowetting coalescing device for coalescing droplets of a water dispersed phase within a hydrocarbon continuous phase, the device comprising the hydrocarbon continuous phase and the droplets of the water dispersed phase, the device further comprising an inlet in fluid communication with a first porous layer and a second porous layer, wherein the first porous layer and the second porous layer are separated by a distance of 2 mm or less, the first porous layer employed as a first electrode, wherein the first electrode is provided with an applied voltage such that the first electrode is employed as a positive electrode, the second porous layer employed as a second electrode, wherein the second electrode is selected from a grounded electrode, a negative electrode, and a less-positive electrode relative to the positive electrode, such that the device includes a voltage difference between the first porous layer and the second porous layer to thereby create an electric field between the first porous layer and the second porous layer, and an outlet receiving a fluid having passed through the first porous layer and the second porous layer, wherein the first porous layer and the second porous layer are made of metal mesh, wherein the first porous layer and the second porous layer each include a dielectric layer on the metal mesh and a hydrophobic layer on the dielectric layer, and wherein the electrowetting coalescing device utilizes electrowetting principles.

2. The device of claim 1, further comprising a third porous layer in fluid communication with the first porous layer and the second porous layer, the first porous being positioned between the second porous layer and the third porous layer, the second porous layer being the grounded electrode, and the third porous layer employed as a grounded electrode to thereby create a second electric field between the first porous layer and the third porous layer.

3. The device of claim 2, the second porous layer being positioned to receive the fluid therethrough prior to the first porous layer, the first porous layer being positioned to receive the fluid therethrough prior to the third porous layer, the second porous layer having a mean average pore size, the first porous layer having a mean average pore size, the third porous layer having a mean average pore size, the mean average pore size of the first porous layer being at least 2 times greater than the mean average pore size of the second porous layer, and the mean average pore size of the third porous layer being at least 2 times greater than the mean average pore size of the first porous layer.

4. The device of claim 3, wherein the first porous layer, the second porous layer, and the third porous layer are each shaped as flat sheets, each flat sheet being parallel with the other flat sheets.

5. The device of claim 3, wherein the first porous layer, the second porous layer, and the third porous layer are each shaped as hollow cylinders.

6. The device of claim 2, wherein the first porous layer, the second porous layer, and the third porous layer are each pleated.

7. The device of claim 1, wherein the metal mesh is woven stainless steel mesh.

8. The device of claim 1, wherein the third porous layer is made of metal mesh, the third porous layer including a dielectric layer on the metal mesh, and a hydrophobic layer on the dielectric layer.

9. The device of claim 8, wherein the dielectric layers and the hydrophobic layers are formed as gradients having a thicker portion and a thinner portion.

10. The device of claim 1, further comprising a spin-on cartridge.

11. The device of claim 10, wherein the first porous layer and the second porous layer are each shaped as hollow cylinders.

12. The device of claim 11, the spin-on cartridge comprising an inlet face and a housing extending from the inlet face to thereby enclose the first porous layer and the second porous layer within the housing.

13. The device of claim 12, the inlet face comprising a centrally-positioned threaded opening having threads adapted to be mated with the threads of a threaded post.

14. The device of claim 1, the second porous layer having a mean average pore size, the mean average pore size of the second porous layer being from 1 to 3 times a mean average size of the droplets passing through the second porous layer.

15. A method of operating the device of claim 1, the method comprising
providing a fluid having the hydrocarbon continuous phase and the droplets of the water dispersed phase to the device of claim 1, the fluid flowing through the first porous layer and the second porous layer,
allowing the droplets to attract to the first porous layer,
allowing the droplets to coalesce within the first porous layer until the droplets form combined droplets,
allowing the combined droplets to flow to and attract to the second porous layer,
allowing the combined droplets to coalesce within the second porous layer until the combined droplets form larger droplets, and
removing the larger droplets from the continuous phase.

16. The method of claim 15, wherein the step of removing the larger droplets occurs in a drain.

17. The method of claim 15, wherein the step of removing the larger droplets occurs in a downstream apparatus selected from the group consisting of barrier filters, cyclones, absorbents, gravity settlers, centrifuges, impactors, lamella separators, inclined stacked plates, screens, and quiescent chambers.

* * * * *